(12) United States Patent
Sakata et al.

(10) Patent No.: US 8,284,779 B2
(45) Date of Patent: Oct. 9, 2012

(54) COMMUNICATION APPARATUS

(75) Inventors: Yoshifumi Sakata, Osaka (JP); Yosuke Matsushita, Osaka (JP); Yuki Minoda, Osaka (JP)

(73) Assignee: Panasonic Corporation, Osaka (JP)

( * ) Notice: Subject to any disclaimer, the term of this patent is extended or adjusted under 35 U.S.C. 154(b) by 156 days.

(21) Appl. No.: 12/525,171

(22) PCT Filed: Nov. 20, 2008

(86) PCT No.: PCT/JP2008/003414
§ 371 (c)(1),
(2), (4) Date: Jul. 30, 2009

(87) PCT Pub. No.: WO2009/072247
PCT Pub. Date: Jun. 11, 2009

(65) Prior Publication Data
US 2010/0034088 A1    Feb. 11, 2010

(30) Foreign Application Priority Data

Dec. 7, 2007  (JP) ................................ 2007-316898
Apr. 1, 2008  (JP) ................................ 2008-095508

(51) Int. Cl.
*H04L 12/28* (2006.01)
(52) U.S. Cl. .................. 370/395.21; 370/235; 370/338; 709/201; 709/246; 709/226; 718/104; 718/100
(58) Field of Classification Search .................. 370/235, 370/395.21, 338; 718/104, 1, 100; 709/201, 709/226, 104, 107, 230, 245
See application file for complete search history.

(56) References Cited

U.S. PATENT DOCUMENTS

| 2002/0065938 | A1* | 5/2002 | Jungck et al. ................. 709/246 |
| 2003/0101244 | A1* | 5/2003 | Lockridge et al. ............ 709/220 |
| 2003/0161288 | A1* | 8/2003 | Unruh ........................... 370/338 |
| 2007/0195788 | A1* | 8/2007 | Vasamsetti et al. ....... 370/395.21 |
| 2008/0192753 | A1* | 8/2008 | Li .............................. 370/395.21 |

FOREIGN PATENT DOCUMENTS

| JP | 2002-118588 | 4/2002 |
| JP | 2003-69632 | 3/2003 |
| JP | 2006-109316 | 4/2006 |

OTHER PUBLICATIONS

International Search Report issued Feb. 24, 2009 in the International (PCT) Application of which the present application is the U.S. National Stage.

* cited by examiner

*Primary Examiner* — Michael Thier
*Assistant Examiner* — Jamal Javaid
(74) *Attorney, Agent, or Firm* — Wenderoth Lind & Ponack, L.L.P.

(57) ABSTRACT

A communication apparatus used in a network where data communication is performed includes a priority data information holding section that holds, in advance, QoS setting information corresponding to domain names, where the QoS setting information is necessary to perform QoS settings for data communicated in the network. A control packet snooping section snoops on a DNS packet received from a DNS server, and obtains a domain name contained in the DNS packet. A priority control setting section, when QoS setting information corresponding to the obtained domain name is contained in the QoS setting information held in the priority data information holding section, performs, based on the QoS setting information, a QoS setting for data communication performed by a communication apparatus which is the transmission source of the DNS packet.

15 Claims, 23 Drawing Sheets

FIG. 10

PRIORITY APPARATUS IDENTIFICATION INFORMATION 3121

(a)
| Mac ADDRESS | PRIORITY APPARATUS NAME |
|---|---|
| 00:01:02:03:04:05 | TERMINAL OF COMPANY A |

(b)
| Mac ADDRESS | IP ADDRESS | PRIORITY APPARATUS NAME |
|---|---|---|
| 00:01:02:03:04:05 | 192.168.0.10 | TERMINAL OF COMPANY A |

(c)
| IP ADDRESS |
|---|
| 192.168.0.10 |

FIG. 11

QoS SETTING PARAMETER 3122

| DATA IDENTIFICATION PARAMETER | | | | | DATA ASSURANCE PARAMETER |
|---|---|---|---|---|---|
| Src Mac | Dst Mac | Prot | Src Port | Dst Port | SERVICE RATE |
|  | 00:00:00: 00:00:01 | UDP |  | 2000 | 6 |

F I G. 1 4

(a) PLC BRIDGE 131c

QoS MANAGEMENT TABLE 250

| QoS SETTING No. | PRIORITY APPARATUS CHARACTERISTIC INFORMATION | DATA IDENTIFICATION PARAMETER | | | | | DATA ASSURANCE PARAMETER | ELAPSED TIME | QoS FUNCTION |
|---|---|---|---|---|---|---|---|---|---|
| | TERMINAL PRIORITY | Src Mac | Dst Mac | Prot | Src Port | Dst Port | SERVICE RATE | | |
| 01 | 255 | | 00:00:00: 00:00:01 | UDP | | 2000 | 6 | 100 | OFF |
| 02 | 10 | | 00:00:00: 00:00:02 | TCP | | 8080 | 6 | 0 | ON |
| 03 | | | | | | | | | |

(b) PLC BRIDGE 131a

| QoS SETTING No. | PRIORITY APPARATUS CHARACTERISTIC INFORMATION | DATA IDENTIFICATION PARAMETER | | | | | DATA ASSURANCE PARAMETER | ELAPSED TIME | QoS FUNCTION |
|---|---|---|---|---|---|---|---|---|---|
| | TERMINAL PRIORITY | Src Mac | Dst Mac | Prot | Src Port | Dst Port | SERVICE RATE | | |
| 11 | 10 | 00:00:00: 00:00:02 | | TCP | 8080 | | 0.1 | 0 | ON |
| 12 | | | | | | | | | |
| 13 | | | | | | | | | |

F I G. 1 5

(a) PLC BRIDGE 131c (AV TERMINAL 100c PERFORMS AV FLOW COMMUNICATION)

QoS MANAGEMENT TABLE 250

| QoS SETTING No. | PRIORITY APPARATUS CHARACTERISTIC INFORMATION | DATA IDENTIFICATION PARAMETER | | | | | DATA ASSURANCE PARAMETER | ELAPSED TIME | QoS FUNCTION |
|---|---|---|---|---|---|---|---|---|---|
| | PRIORITY | Src Mac | Dst Mac | Prot | Src Port | Dst Port | SERVICE RATE | | |
| 01 | 255 | | 00:00:00:00:00:01 | UDP | | 2000 | 6 | 30 | OFF |
| 02 | 20 | | 00:00:00:00:00:03 | UDP | | | 12 | 0 | ON |
| 03 | | | | | | | | | |

(b) PLC BRIDGE 131c (AV TERMINAL 100a PERFORMS AV FLOW COMMUNICATION)

| QoS SETTING No. | PRIORITY APPARATUS CHARACTERISTIC INFORMATION | DATA IDENTIFICATION PARAMETER | | | | | DATA ASSURANCE PARAMETER | ELAPSED TIME | QoS FUNCTION |
|---|---|---|---|---|---|---|---|---|---|
| | PRIORITY | Src Mac | Dst Mac | Prot | Src Port | Dst Port | SERVICE RATE | | |
| 01 | 255 | | 00:00:00:00:00:01 | UDP | | 2000 | 6 | 0 | ON |
| 02 | 20 | | 00:00:00:00:00:03 | UDP | | | 12 | 0 | OFF |
| 03 | | | | | | | | | |

F I G. 17

PRIORITY DATA INFORMATION HOLDING SECTION 280

DNS QUERY DESTINATION DB 303

| DNS QUERY DESTINATION | PRIORITY APPARATUS TYPE |
|---|---|
| SERVER NAME OF INITIALIZATION SERVER 170 | IP PHONE |
| SERVER NAME OF SIP SERVER 180 | IP PHONE |
| SERVER NAME OF AV SERVER 120a | AV TERMINAL |

QoS SETTING CREATION DB 313

| PRIORITY APPARATUS TYPE | PRIORITY APPARATUS CHARACTERISTIC INFORMATION | DATA ASSURANCE PARAMETER | |
|---|---|---|---|
| | TERMINAL PRIORITY | Priority | DELAY TOLERANCE VALUE |
| IP PHONE | 255 | 7 | 30 |
| AV TERMINAL | 128 | 6 | 300 |

FIG. 18

QoS MANAGEMENT TABLE 250

(a) PLC BRIDGE 131c

| QoS SETTING No. | PRIORITY APPARATUS CHARACTERISTIC INFORMATION | DATA IDENTIFICATION PARAMETER | | DATA ASSURANCE PARAMETER | | ELAPSED TIME | QoS FUNCTION |
|---|---|---|---|---|---|---|---|
| | PRIORITY | Src Mac | Dst Mac | Priority | DELAY TOLERANCE VALUE | | |
| 01 | 255 | | 00:00:00:00:00:01 | 7 | 30 | 0 | ON |
| 02 | 128 | | 00:00:00:00:00:03 | 6 | 300 | 30 | OFF |
| 03 | | | | | | | |

(b) PLC BRIDGE 131a

| QoS SETTING No. | PRIORITY APPARATUS CHARACTERISTIC INFORMATION | DATA IDENTIFICATION PARAMETER | | DATA ASSURANCE PARAMETER | | ELAPSED TIME | QoS FUNCTION |
|---|---|---|---|---|---|---|---|
| | PRIORITY | Src Mac | Dst Mac | Priority | DELAY TOLERANCE VALUE | | |
| 11 | 255 | 00:00:00:00:00:01 | | 7 | 30 | 0 | ON |
| 12 | 128 | 00:00:00:00:00:03 | | 6 | 300 | 30 | OFF |
| 13 | | | | | | | |

FIG. 19   PRIOR ART (a) QoS SETTING PARAMETER

| DATA IDENTIFICATION PARAMETER | DATA ASSURANCE PARAMETER |

(b) DATA IDENTIFICATION PARAMETER

| Src Mac | Dst Mac | Src IP | Dst IP | Prot | Src Port | Dst Port |

(c) DATA ASSURANCE PARAMETER

| SERVICE RATE | DELAY TOLERANCE VALUE |

(d) DATA ASSURANCE PARAMETER

| Priority | DELAY TOLERANCE VALUE |

COMMUNICATION APPARATUS

BACKGROUND OF THE INVENTION

1. Technical Field

The present invention relates to a communication apparatus for performing communication quality assurance of an AV flow on the TCP/IP network, and more particularly, to a communication apparatus for performing in advance, by using a control packet, priority control setting for an AV flow for which communication quality assurance is to be performed.

2. Background Art

In a best effort communication system in which communication is performed by using the Internet, a packet can be dropped when congestion occurs in the network. This does not become a significant problem for a user in a case where such packet drop occurs during communication, such as Web browsing, which is not necessary to be performed in real time, although it takes some time to browse Web pages. However, in a case where packet drop described above occurs during communication, such as via an Internet phone whose use is rapidly increasing used in recent years, which is necessary to be performed in real time, the sound is interrupted and therefore it becomes impossible to perform the call, which is a significant problem for a user.

The communication quality assurance (QoS: Quality of Service) technique is used as a technique for assuring communication quality of real time communication performed with an Internet phone and the like. The QoS technique is a technique for performing control, in a relay apparatus which relays a packet transmitted and received in the network, such that a bandwidth on the communication path is secured and data is transmitted in priority to other data flows so as not to cause drop or delay of a packet in real time communication.

In recent years, the wireless LAN (Local Area Network) compliant with IEEE (Institute of Electrical and Electronics Engineers) 802.11e, and the PLC (Power Line Communications) network such as HomePlug AV introduced by the HomePlug Alliance for performing communication with use of a power line, are standardized and are in practical use as QoS techniques for assuring configured communication quality.

In a case where it is intended that communication in which communication quality is assured is performed by using the above-described network that assures communication quality, it is necessary to set, in a relay apparatus on the communication path, setting parameters (hereinafter, referred to as "QoS setting parameters") for assuring communication quality necessary for a service which a user uses (hereinafter, referred to as "QoS setting").

First, the QoS setting parameters will be described. FIG. 19 shows an example of the QoS setting parameters. In FIG. 19(*a*), the QoS setting parameters include data identification parameters for identifying data for which communication quality assurance is to be performed, and data assurance parameters for assuring the identified data.

FIG. 19(*b*) shows the data identification parameters. In FIG. 19(*b*), the data identification parameters include SrcMac, DstMac, SrcIP, DstIP, Prot, SrcPort, and DstPort. SrcMac, DstMac, SrcIP, and DstIP represent the source MAC address, the destination MAC address, the source IP address, and the destination IP address, of an IP packet, respectively. Prot represents a protocol such as TCP (Transmission Control Protocol) or UDP (User Datagram Protocol). SrcPort and DstPort respectively represent a source port number and a destination port number of TCP, UDP, or the like. After the data identification parameters are set as described above, if an inputted packet matches all the values of the set parameters, communication quality assurance is to be performed for the inputted packet.

The data identification parameters are not limited to the configuration in FIG. 19(*b*), and there can be used any information that is usable for specifying data for which communication quality assurance is to be performed. For example, values of ToS (Type of Service), TC (Traffic Class), or VLAN in IP headers, or the like may be used as data identification parameters.

FIG. 19(*c*) shows data assurance parameters used for performing bandwidth guarantee. In FIG. 19(*c*), the data assurance parameters include a service rate which indicates a bandwidth necessary to perform bandwidth guarantee, and a delay tolerance value which indicates how long packets may delay.

FIG. 19(*d*) shows data assurance parameters used for performing priority control. In FIG. 19(*d*), the data assurance parameters include a priority used in the network which supports priority control, and a delay tolerance value.

The data assurance parameters are not limited to the configurations shown in FIG. 19(*c*) and FIG. 19(*d*), and any information that designates quality assurance necessary for data can be used. For example, a buffer size necessary to prevent packet drop, or the like may be used as the data assurance parameter.

Next, a method for performing QoS setting for a relay apparatus of conventional art will be described. A method using RSVP (Resource ReSerVation Protocol) specified by the IETF (Internet Engineering Task Force) which is the standards organization of TCP/IP, is one of the methods for causing a terminal having information about characteristics of data flows in real time communication to perform QoS setting for a relay apparatus on a communication path between the terminal and a server.

However, if RSVP is used to perform QoS setting in a relay apparatus on the communication path, a transmitting terminal, a receiving terminal, and a relay apparatus of a data flow are all required to support RSVP. Therefore, the use of RSVP is restricted. In the network at home where various apparatuses such as latest products, old products, products of different manufacturers, and the like are expected to be used together, it is a significant restriction that advantages cannot be obtained unless a transmitting terminal, a receiving terminal, and a relay apparatus all support RSVP.

As a method for performing QoS setting for a relay apparatus on the communication path without using RSVP, there is a method in which a user searches for QoS setting parameters which are required for a service used by the user and then directly performs QoS setting for the relay apparatus by using the QoS setting parameters which have been found. However, it is extremely difficult for a general user who lacks knowledge about the network to search for QoS setting parameters and to directly perform QoS setting for the relay apparatus by using the QoS setting parameters which have been found. In addition, if a user incorrectly sets QoS setting parameters, necessary communication quality cannot be assured.

Therefore, in the network at home, it is desired that a relay apparatus automatically performs communication quality assurance of real time communication so that a user will not have to directly perform QoS setting for the relay apparatus, even if RSVP or the like is used and a transmitting terminal and a receiving terminal which transmit or receive a data flow in real time communication do not support QoS signaling to perform QoS setting.

In order for a relay apparatus to automatically perform QoS setting for an AV flow used in real time communication, it is necessary to detect an AV flow whose communication quality is to be assured. As a method for detecting an AV flow, there is a method in which a content request flow for requesting a content of an AV flow is snooped on, or a method using a control protocol for controlling an AV flow for which SIP (Session Initiation) or RTSP (RealTime Streaming Protocol) standardized by the IETF is used. Further, there is also another method in which RTP (Realtime Transport Protocol), which is a protocol for transferring an AV flow standardized by the IETF, is used. In this method, a flow is assumed to be an AV flow when the header of the flow has the RTP configuration or has similar features.

As described above, there are several methods for detecting an AV flow. However, there are various types of applications for an AV flow, and a large number of control protocols are used. Therefore, a relay apparatus needs to be able to analyze a large number of control protocols and AV flow transfer protocols even if any above-described method for detecting an AV flow is used. In addition, there is a problem that since analysis of an AV flow performed in a method for detecting an AV flow is complicated, processing load on a relay apparatus which is configured so as to be optimized for relay functions is great.

A relay apparatus in which such processing load for analysis of control protocols and AV flow transfer protocols is reduced, is disclosed in, for example, Patent Document 1. FIG. 20 shows a configuration of a content distribution quality control system 9000 of conventional art. In FIG. 20, the content distribution quality control system 9000 includes an AV terminal 10, a terminal 11, an AV server 12, a plurality of relay apparatuses 13a to 13c, and a content distribution network 14.

The AV terminal 10 receives an AV stream from the AV server 12 to reproduce video and audio. On the other hand, the terminal 11 receives data other than AV data, whereby, for example, Web pages can be browsed. The AV server 12 transmits an AV stream to the AV terminal 10. The AV stream transmitted by the AV server 12 is received by the AV terminal 10 via the relay apparatus 13c, the content distribution network 14, and the relay apparatus 13a. The relay apparatuses 13a to 13c perform communication assurance setting of an AV flow, and based on the setting, performs relaying between: the AV terminal 10 and the terminal 11; and the AV server 12.

FIG. 21 shows a configuration of the relay apparatuses 13a to 13c of conventional art. In FIG. 21, each of the relay apparatuses 13a to 13c includes a receiving section 20, a priority flow characteristic information detecting section 21, a priority flow characteristic information analyzing section 22, a QoS setting parameter determining section 23, a QoS setting parameter managing section 24, a QoS management table 25, a QoS function section 26, and a transmitting section 27.

The receiving section 20 receives a packet to be relayed. The priority flow characteristic information detecting section 21 detects a content request/response flow and a control protocol flow in the packet received by the receiving section 20. Then, the control protocol is identified based on the destination port number and the well-known port number of the control protocol flow. The priority flow characteristic information analyzing section 22 obtains the quality class and the source address from the content request/response flow detected by the priority flow characteristic information detecting section 21, and then notifies the QoS setting parameter determining section 23 of the quality class and the source address. Moreover, the priority flow characteristic information analyzing section 22 obtains the destination address and the source address of the control protocol flow detected by the priority flow characteristic information detecting section 21, and then notifies the QoS setting parameter determining section 23 of the destination address and the source address. If the source address of the content request/response flow and the source address of the control protocol flow coincide with each other, the control protocol flow is determined to be a flow subsequent to the precedent content request/response flow. The QoS setting parameter determining section 23 determines QoS setting parameters based on the quality class of the content request/response flow and the destination address and the source address of the control protocol flow, of which the priority flow characteristic information analyzing section 22 has notified the QoS setting parameter determining section 23. The QoS setting parameter managing section 24 registers in the QoS management table 25 the QoS setting parameters determined by the QoS setting parameter determining section 23. The QoS function section 26 transmits data to the transmitting section 27 based on the QoS setting registered in the QoS management table 25. The transmitting section 27 transmits a packet for which communication quality assurance has been performed by the QoS function section 26.

FIG. 22 is a flowchart showing steps of communication quality assurance of an AV flow of conventional art. In step S10, the priority flow characteristic information detecting section 21 detects a content request/response flow, and the priority flow characteristic information analyzing section 22 obtains the quality class and the source address from general information, such as an URL, included in the content request/response flow detected by the priority flow characteristic information detecting section 21. In step S11, the priority flow characteristic information detecting section 21 detects the control protocol flow based on the destination port number and the well-known port number of the control protocol flow, and the priority flow characteristic information analyzing section 22 obtains the destination address and the source address of the control protocol flow detected by the priority flow characteristic information detecting section 21. If the source address of the content request/response flow and the source address of the control protocol flow coincide with each other, the control protocol flow is determined to be a flow subsequent to the precedent content request/response flow. In step S12, the QoS setting parameter determining section 23 determines, as QoS setting parameters, the quality class of the content request/response flow, and the destination address and the source address of the control protocol flow. In step S13, the QoS setting parameter managing section 24 registers in the QoS management table 25 the QoS setting parameters determined by the QoS setting parameter determining section 23. Thus, in each of the relay apparatuses 13a to 13c, QoS setting parameters are registered in the QoS management table 25, and if the destination address and the source address of a streaming content flow coincide with the destination address and the source address of the registered control protocol flow, the streaming content flow is assumed to be an AV flow and communication quality assurance is performed for the streaming content flow.

As described above, each of the relay apparatuses 13a to 13c of conventional art obtains the quality class and the source address based on general information, such as an URL, included the content request/response flow, and obtains the destination address and the source address of the control protocol flow, so as to register QoS setting parameters. Since each of the relay apparatuses 13a to 13c identifies a control protocol flow based on only the well-known port number, it is not necessary to implement processing to analyze each of a plurality of control protocols, and therefore, processing load is reduced.

Patent Document 1: Japanese Laid-Open Patent Publication No. 2003-69632

However, each of the relay apparatuses 13a to 13c of the conventional art has the following problems. Each of the relay apparatuses 13a to 13c receives an HTTP packet, analyzes the received HTTP packet, and registers QoS setting parameters as described above. However, a large number of HTTP packets are communicated in the network. Therefore, each of the relay apparatuses 13a to 13c needs to analyze a large amount of HTTP packets. As a result, processing load on each of the relay apparatuses 13a to 13c is still large.

In addition, each of the relay apparatuses 13a to 13c identifies a control protocol flow based on the well-known port number. However, since there are published a large number of well-known port numbers, processing load on each of the relay apparatuses 13a to 13c is still large also at the time of performing processing to identify a control protocol flow.

Further, there is a problem that since a well-known port number is used in each of the relay apparatuses 13a to 13c, only an AV flow for which a published protocol is used can be detected and an AV flow for which a unique protocol is used cannot be detected.

In addition, when each of the relay apparatuses 13a to 13c receives an HTTP packet, processing to obtain the quality class is to analyze the data section of the HTTP packet. FIG. 23 shows an HTTP packet format. In FIG. 23, the HTTP packet format includes a header section including an Ethernet (registered trademark) header, an IP header, and a TCP header, and includes a data section including application data. As shown in FIG. 23, in the data section of the HTTP packet, a position where a priority determination character string indicating the quality class is stored is not fixed, and additionally, the priority determination character string is not always fixed-length data. Therefore, processing load on each of the relay apparatuses 13a to 13c is increased due to processing performed when each of the relay apparatuses 13a to 13c obtains, from the text-based data section of the HTTP packet, the quality class which is not stored in a fixed position and which is variable-length data.

Therefore, an object of the present invention is to provide a relay apparatus which can reduce processing load for QoS setting for an AV flow used in real time communication, and which can be widely used, i.e., can detect not only an AV flow for which a published protocol is used, but also an AV flow for which an unpublished protocol or a unique protocol is used.

SUMMARY OF THE INVENTION

In order to attain the object mentioned above, a communication apparatus of the present invention that is used in a network where data communication is performed, comprises: a priority data information holding section for holding, in advance, QoS setting information corresponding to domain names, which QoS setting information is necessary to perform QoS setting for data communicated in the network; a control packet snooping section for snooping on a DNS packet received from a DNS (Domain Name System) server in the network, and obtaining a domain name contained in the DNS packet; and a priority control setting section for, when QoS setting information corresponding to the obtained domain name exists in the QoS setting information held in the priority data information holding section, performing, based on the QoS setting information, QoS setting for data communication performed by a communication apparatus which is the transmission source of the DNS packet.

It is noted that a DNS packet is a standard query packet which is transmitted/received based on the DNS protocol standardized by the IETF, and is used for obtaining an IP address from a domain name in the IP network. In the DNS protocol, a standard query packet is transmitted, with a domain name whose IP address is to be searched for, to a DNS server, whereby an IP address of a server or the like which is to be accessed can be obtained.

It is preferable that the control packet snooping section specifies a service providing carrier based on the domain name contained in the DNS packet, and based on the service providing carrier and the QoS setting information, the priority control setting section performs, for the service providing carrier, QoS setting for data communication performed by the communication apparatus which is the transmission source of the DNS packet.

Alternatively, it is preferable that the control packet snooping section specifies a provided service based on the domain name contained in the DNS packet, and based on the provided service and the QoS setting information, the priority control setting section performs, for the provided service, QoS setting for data communication performed by the communication apparatus which is the transmission source of the DNS packet.

In addition, it is preferable that the QoS setting information includes priority data identification information used for identifying priority data which is communicated in the provided service and whose communication quality is to be assured, and the priority control setting section further performs QoS setting for the priority data, based on the priority data identification information.

Alternatively, it is preferable that the communication apparatus of the present invention further comprises a priority communication apparatus information storing section for storing priority communication apparatus information which indicates information about a communication apparatus which is the transmission source of the DNS packet and which communicates priority data whose communication quality is to be assured, the priority data being among the data communicated in the network, wherein the priority control setting section further performs, based on the priority communication apparatus information, QoS setting for data communication performed by the communication apparatus which is the transmission source of the DNS packet.

Alternatively, it is preferable that the communication apparatus of the present invention further comprises a priority communication apparatus information storing section for storing priority communication apparatus information which indicates information about a communication apparatus which is the transmission source of the DNS packet and which communicates priority data whose communication quality is to be assured, the priority data being among the data communicated in the network, wherein the QoS setting information includes priority data identification information used for identifying priority data which is communicated in the provided service and whose communication quality is to be assured, and the priority control setting section further performs QoS setting for the priority data, based on the priority communication apparatus information and the priority data identification information.

In addition, it is preferable that priority data identification information includes at least one of a protocol type and a port number.

In addition, it is preferable that the QoS setting information includes priority data characteristic information which indicates a transmission characteristic with respect to priority data which is communicated in the provided service and whose communication quality is to be assured, and the priority control setting section further performs QoS setting for the priority data, based on the priority data characteristic information.

In addition, it is preferable that the priority data characteristic information includes at least one of an average rate, a burst size, and a maximum rate.

In addition, it is preferable that the QoS setting information held, in advance, in the priority data information holding section is updated by using information held in an external apparatus connected to the communication apparatus of the present invention.

It is preferable that the control packet snooping section specifies a provided service, based on an IP address contained in a DNS response packet which is a response, to the DNS packet, in relation to the domain name contained in the DNS packet, and based on the provided service and the QoS setting information, the priority control setting section performs, for the provided service, QoS setting for data communication performed by the communication apparatus which is the transmission source of the DNS packet.

Alternatively, it is preferable that the control packet snooping section analyzes, when the domain name contained in the DNS packet is that of a SIP (Session Initiation Protocol) server, a SIP packet received from the SIP server and thereby specifies the corresponding communication apparatus performing communication with the communication apparatus which is the transmission source of the DNS packet, and the priority control setting section performs, based on the QoS setting information, QoS setting for data communication performed between the corresponding communication apparatus and the communication apparatus which is the transmission source of the DNS packet.

In addition, it is preferable that the communication apparatus further comprises a priority control section for relaying data communicated in the network, based on the QoS setting.

In addition, it is preferable that the QoS setting is performed for priority data whose communication quality is to be assured, the priority data being among the data communicated in the network.

Alternatively, the QoS setting is performed for data other than priority data whose communication quality is to be assured, the priority data being among the data communicated in the network.

Note that a series of processing performed by the above-described communication apparatus of the present invention can be considered as a QoS setting method performed by the communication apparatus. The method may be provided in the form of a program which causes a computer to execute the processing. The program may be introduced into the computer in the form where the program is stored in a computer-readable storage medium.

As described above, in the communication apparatus of the present invention, it is not necessary to analyze HTTP packets which are communicated in large numbers, a DNS packet received from a DNS server is snooped on, and QoS setting is performed based on the domain name contained in the DNS packet. Therefore, a relay apparatus in which processing load for QoS setting for an AV flow used in real time communication is reduced, can be realized. Moreover, in the communication apparatus of the present invention, a control packet which is transmitted during data communication is used as the DNS packet. Therefore, there can be realized a relay apparatus which can be widely used, i.e., can detect not only an AV flow for which a published protocol is used, but also an AV flow for which an unpublished protocol or a unique protocol is used.

BRIEF DESCRIPTION OF THE DRAWINGS

FIG. 10 shows a priority apparatus identification information 3121 for specifying an AV terminal for which priority control is to be performed.

FIG. 11 shows a QoS setting parameter 3122 according to the present embodiment.

FIG. 14 shows the QoS management tables 250 of the PLC bridge 131$c$ and the PLC bridge 131$a$.

FIG. 15 shows the QoS management table 250 of the PLC bridge 131$c$ in a case where an AV terminal 100$c$ and an AV terminal 100$a$ perform AV flow communication.

FIG. 17 shows a DNS query destination DB 303 and a QoS setting creation DB 313 held in the priority data information holding section 280 of each of the PLC bridges 131$a$ to 131$c$.

FIG. 18 shows the QoS management tables 250 of the PLC bridge 131$c$ and the PLC bridge 131$a$.

FIG. 19 shows an example of QoS setting parameters.

Figure 1:
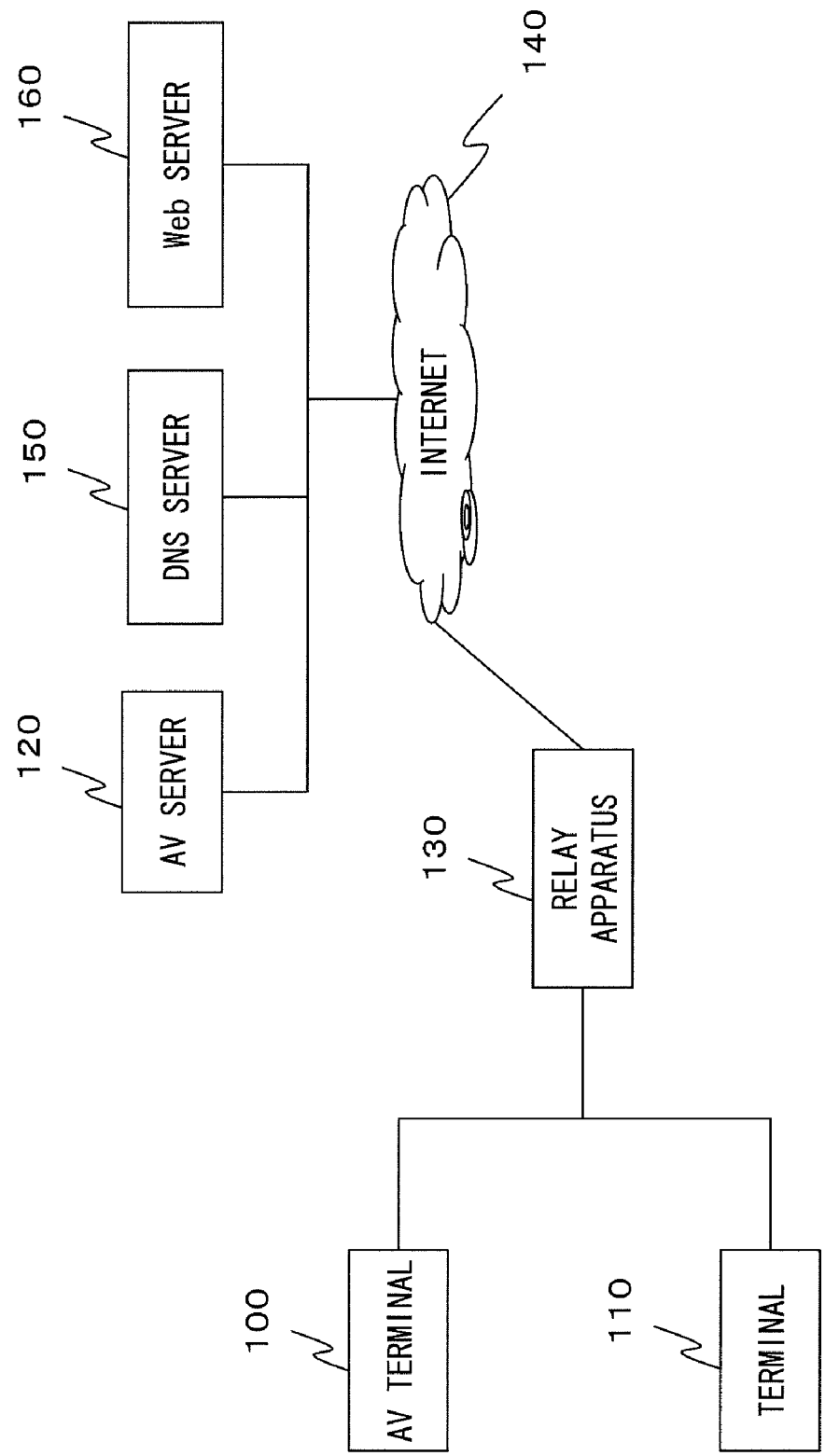
FIG. 1 shows a configuration of a priority data communication assurance system 1000 according to the first embodiment of the present invention.

DESCRIPTION OF THE REFERENCE CHARACTERS 1000, 2000, 3000 priority data communication assurance system
9000 content distribution quality control system 10, 100, 100a to 100c AV terminal
101a to 101b IP phone
11, 110 terminal
12, 120, 120a to 120c AV server
13a to 13c, 130 relay apparatus
14 content distribution network
131a to 131c PLC bridge
140 Internet
150 DNS server
160 Web server
170 priority data information managing server
180 initialization server
190 SIP server
20, 200 receiving section
21 priority flow characteristic information detecting section
210 control packet snooping section
22 priority flow characteristic information analyzing section
23, 230 QoS setting parameter determining section
24, 240 QoS setting parameter managing section
25, 250 QoS management table
26 QoS function section
260 priority control section
27, 270 transmitting section
280 priority data information holding section
290 priority control setting section
400 timer
410 priority data information updating section
300, 301, 302, 303 DNS query destination DB
310, 311, 312, 313 QoS setting creation DB
3121 priority apparatus identification information
3122 QoS setting parameter
S100 to S160 steps of QoS setting parameter registration processing
S200 to S260 steps of QoS function ON processing
S300, S310 steps of QoS function OFF processing
S10 to S13 steps of communication quality assurance for AV flow

DETAILED DESCRIPTION OF THE INVENTION

Hereinafter, embodiments of the present invention will be described in detail with reference to the drawings.

First Embodiment

FIG. 1 shows a configuration of a priority data communication assurance system 1000 according to the first embodiment of the present invention. In FIG. 1, the priority data communication assurance system 1000 includes an AV terminal 100, a terminal 110, an AV server 120, a relay apparatus 130, the Internet 140, a DNS server 150, and a Web server 160.

The AV terminal 100 receives a stream from the AV server 120 to reproduce video and audio. On the other hand, the terminal 110 receives from the Web server 160 data other than AV data, whereby, for example, Web pages can be browsed. The AV server 120 transmits an AV stream to the AV terminal 100. The AV stream transmitted by the AV server 120 is received by the AV terminal 100 via the Internet 140 and the relay apparatus 130. The DNS server 150 receives DNS packets from the AV terminal 100 and the terminal 110, and then performs name resolution by mapping domain names to IP addresses. Hereinafter, a domain name set in a DNS packet is referred to as a DNS query destination. The relay apparatus 130 performs communication assurance setting of an AV flow, and based on the setting, performs relaying between: the AV terminal 100 and the terminal 110; and the AV server 120 and the Web server 160. In addition, the relay apparatus 130 also relays DNS packets transmitted from the AV terminal 100 and the terminal 110 to the DNS server 150.

Figure 2:
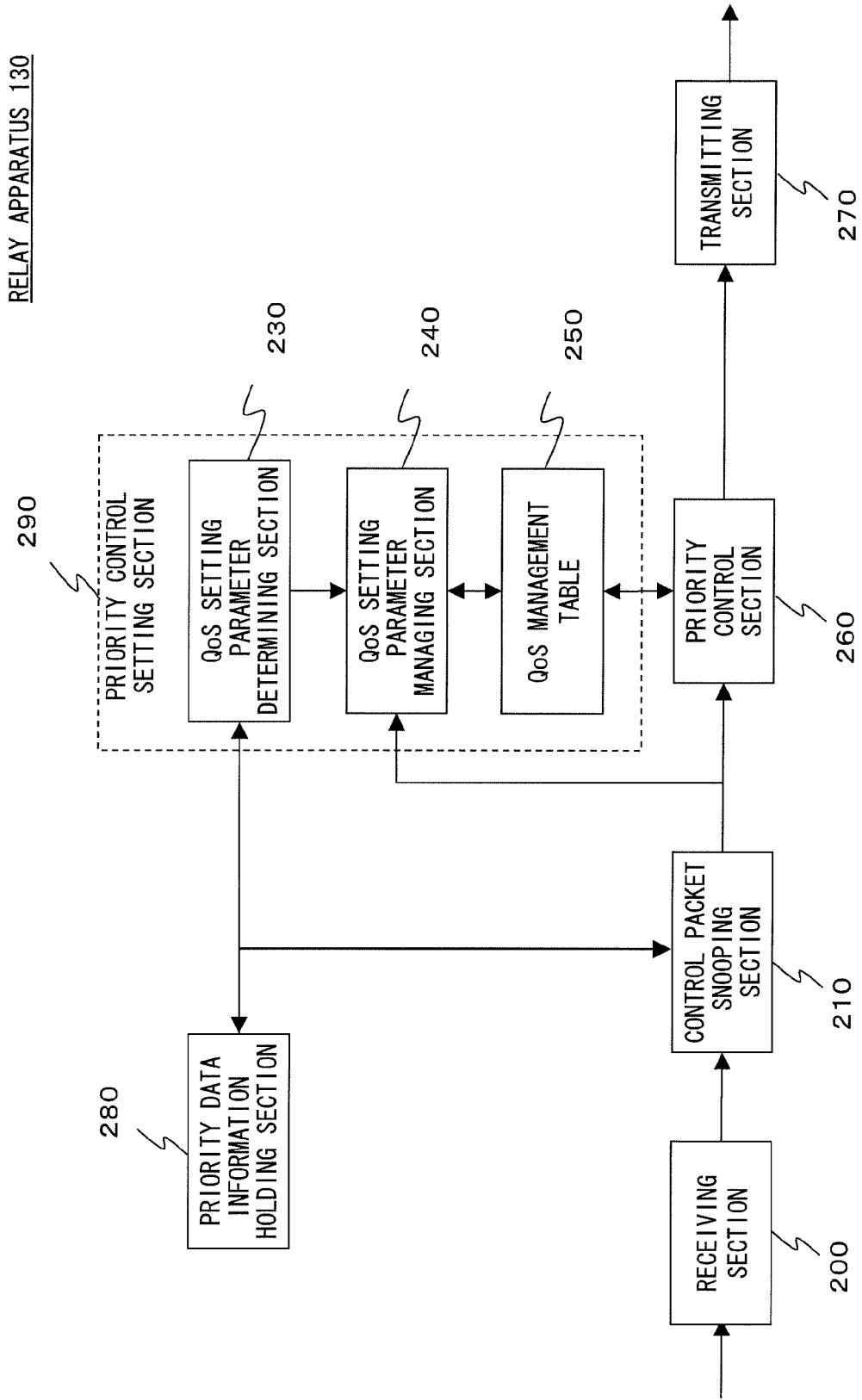
FIG. 2 shows a configuration of a relay apparatus 130 according to the first embodiment of the present invention.

Firstly, steps in which the relay apparatus 130 performs QoS setting by using a DNS packet will be described here. FIG. 2 shows a configuration of the relay apparatus 130 according to the first embodiment of the present invention. In FIG. 2, the relay apparatus 130 includes a receiving section 200, a control packet snooping section 210, a priority data information holding section 280, a priority control setting section 290, a priority control section 260, and a transmitting section 270. The priority control setting section 290 includes a QoS setting parameter determining section 230, a QoS setting parameter managing section 240, and a QoS management table 250.

Figure 3:
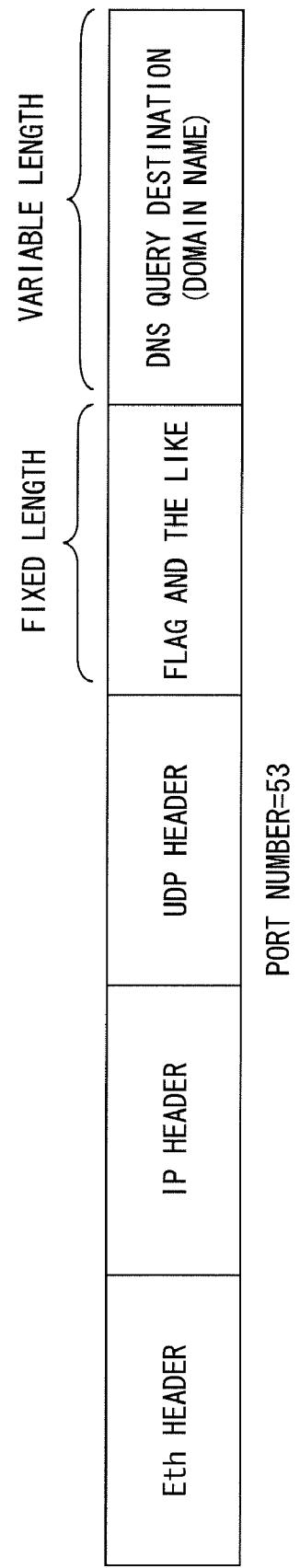
FIG. 3 shows a DNS packet format.

The receiving section 200 receives a DNS packet from the AV terminal 100 in the network. The DNS packet is transmitted from the AV terminal 100 to the DNS server 150 when, for example, the AV terminal 100 is started. FIG. 3 shows a DNS packet format. In FIG. 3, the DNS packet format includes an Ethernet (registered trademark) header, an IP header, a UDP header, fixed-length data containing a flag and the like, and a variable-length data containing a DNS query destination (domain name).

The port number of a DNS packet is a well-known port number=53. With use of this number, the control packet snooping section 210 detects that a packet received by the receiving section 200 is a DNS packet. The control packet snooping section 210 specifies communication currently performed, based on the DNS query destination (domain name) of the DNS packet and QoS setting information held in the priority data information holding section 280. The priority control setting section 290 performs priority control setting for the specified communication, based on the QoS setting information held in the priority data information holding section 280.

Figure 4:
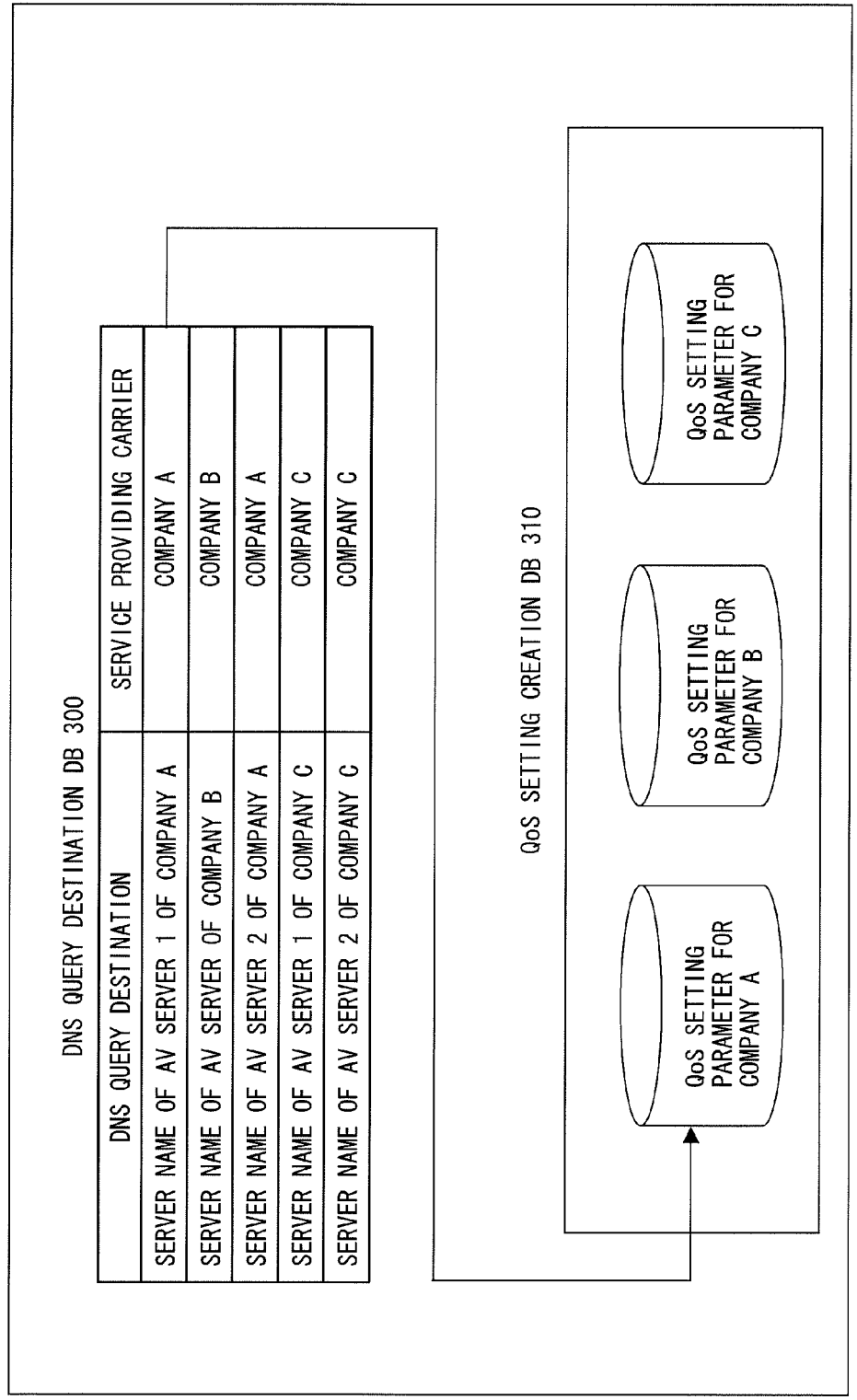
FIG. 4 shows a DNS query destination DB 300 and a QoS setting creation DB 310 held in a priority data information holding section 280.

Here, steps in which the priority control setting section 290 performs priority control setting will be described. The priority data information holding section 280 holds, in advance, QoS setting information which is necessary to create a QoS management table. FIG. 4 shows a DNS query destination DB 300 and a QoS setting creation DB 310 which are held in the priority data information holding section 280. For example, when the control packet snooping section 210 specifies, based on the DNS query destination DB 300 shown in FIG. 4, that communication currently performed is provided as a service by Company A, the QoS setting parameter determining section 230 of the priority control setting section 290 determines QoS setting parameters for Company A based on the QoS setting creation DB 310. The QoS setting parameter managing section 240 registers in the QoS management table 250 the QoS setting parameters determined by the QoS setting parameter determining section 230. As described above, the priority control section 260 performs priority control based on QoS setting for a service providing carrier for which priority control setting has been performed by the priority control setting section 290. Thus, by holding, in the priority data information holding section 280, QoS setting parameters used by a service providing company, the same communication assurance of priority data as that performed by the service providing company can be realized.

Figure 5:
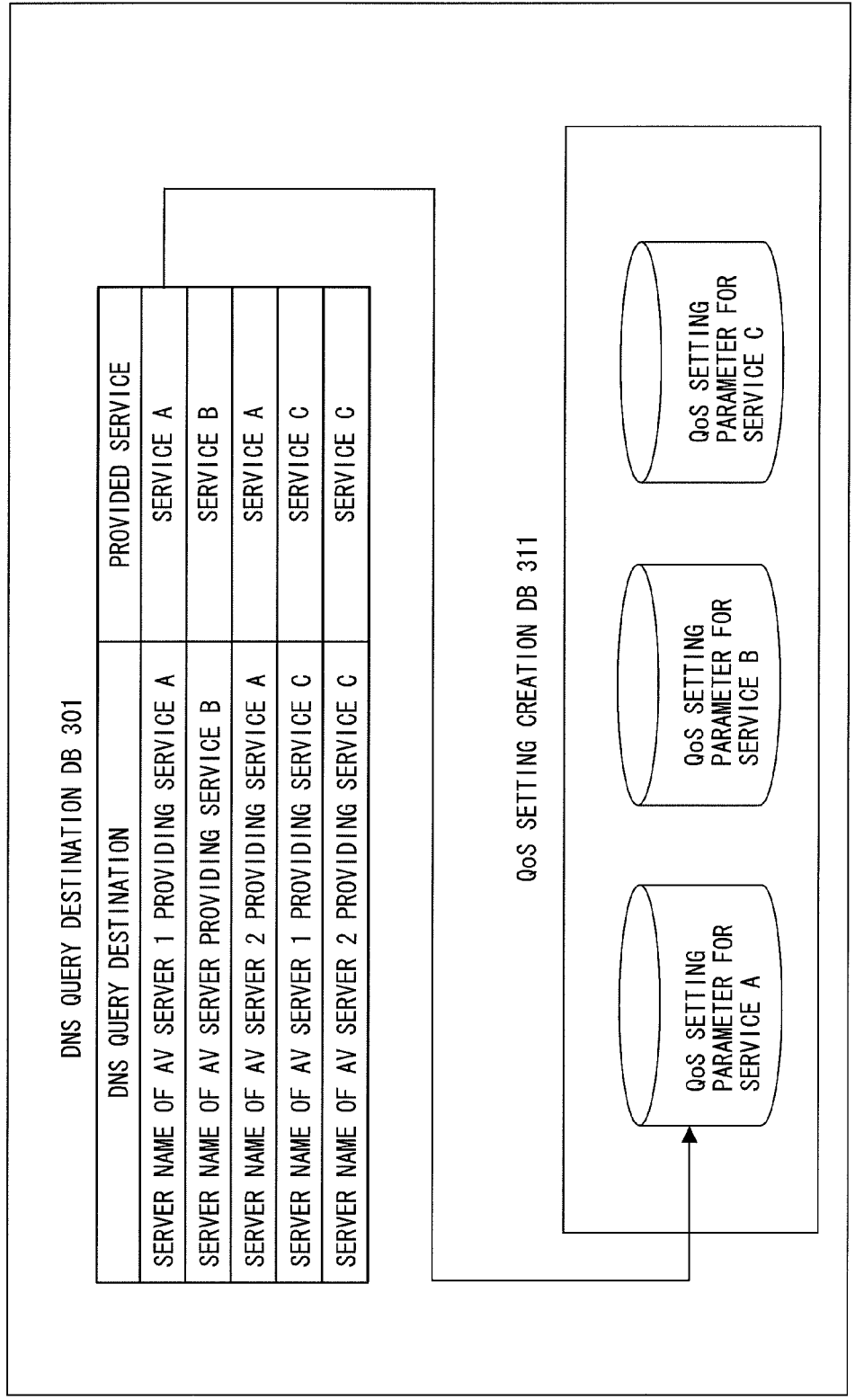
FIG. 5 shows a DNS query destination DB 301 and a QoS setting creation DB 311 held in the priority data information holding section 280.

FIG. 5 shows a DNS query destination DB 301 and a QoS setting creation DB 311 which are held in the priority data information holding section 280. For example, when the control packet snooping section 210 specifies, based on the DNS query destination DB 301 shown in FIG. 5, that communication currently performed is provided as a service A, the QoS setting parameter determining section 230 of the priority control setting section 290 determines QoS setting parameters for the service A based on the QoS setting creation DB 311. The QoS setting parameter managing section 240 registers, in the QoS management table 250, the QoS setting parameters determined by the QoS setting parameter determining section 230. As described above, the priority control section 260 performs priority control based on QoS setting for a provided service for which priority control setting has been performed by the priority control setting section 290. Thus, by holding, in the priority data information holding section 280, QoS setting parameters for each provided service, communication assurance of priority data in which setting is performed in detail for each provided service can be realized. For example, setting of a priority can be performed in accordance with whether a provided service is commercial or non-commercial.

As described above, the relay apparatus 130 performs QoS setting based on a DNS query destination (domain name) of a DNS packet and QoS setting information held in the priority data information holding section 280. A DNS packet is transmitted before data communication is actually performed, or, for example, when an AV terminal is started. That is, frequency of transmitting a DNS packet is less than an HTTP packet described in Background Art, and therefore, influence which the DNS packet has on data communication when the data communication is actually performed is also less than an HTTP packet. Accordingly, frequency of receiving a packet to be analyzed by the relay apparatus 130 is decreased, thereby reducing processing load.

Moreover, since the relay apparatus 130 obtains a DNS query destination (domain name) from a binary data section of a DNS packet in which data position is fixed, processing load is reduced in comparison with a case where a quality class or the like is obtained from a text-based variable-length data section of an HTTP packet described in Background Art. Moreover, the relay apparatus 130 performs QoS setting based on processing, such as DNS packet transmission, generally performed by an AV terminal, whereby communication quality assurance of an AV flow can be provided even in a case where an unpublished unique protocol is used for the AV flow, a control packet, a content request/response packet.

As described above, the relay apparatus according to the first embodiment of the present invention performs QoS setting based on a DNS packet, thereby reducing processing load for QoS setting for an AV flow which is used in real time communication, and also enabling detection of not only an AV flow for which a published protocol is used, but also an AV flow for which an unpublished protocol or a unique protocol is used.

In the present embodiment, a service providing carrier or a provided service is specified based on a DNS query destination (domain name) of a DNS packet. However, a service providing carrier or a provided service may be specified based on an IP address contained in a DNS response packet that is a response to the DNS packet (DNS query packet) and then QoS setting may be performed. Specifically, the IP address contained in a DNS response packet is an IP address of an AV server. Moreover, in the present embodiment, although QoS setting is performed based on a DNS packet, a QoS setting is not limited thereto. For example, QoS setting may be performed by using a SIP packet.

It should be understood that the relay apparatus according to the present embodiment can be used for a wired or wireless network using the Internet, and in addition, for a PLC network. In the present embodiment, the priority control setting section performs QoS setting for each service providing carrier or for each provided service, and the priority data information holding section holds the information shown in FIG. 4 and FIG. 5. However, the present invention is not limited thereto. For example, an AV terminal using a particular service may be specified to perform QoS setting for each AV terminal. Specific embodiments for these configurations will be described in the second to fourth embodiments below.

Second Embodiment

Figure 6:
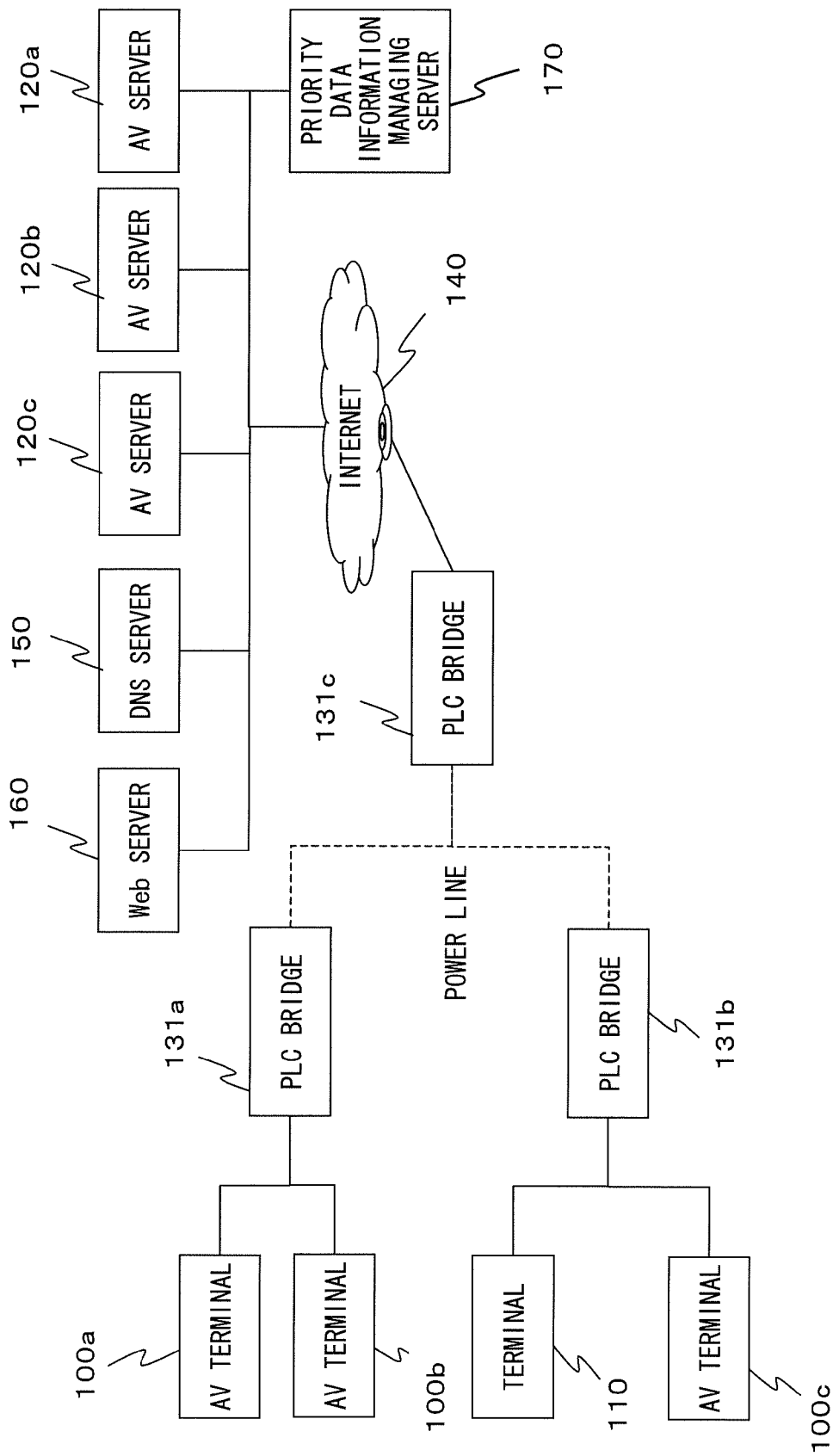
FIG. 6 shows a configuration of a priority data communication assurance system 2000 according to the second embodiment of the present invention.

In the present embodiment, a case where the relay apparatus according to the first embodiment of the present invention is applied to a PLC bridge will be specifically described. FIG. 6 shows a configuration of a priority data communication assurance system 2000 according to the second embodiment of the present invention. In FIG. 6, the priority data communication assurance system 2000 includes AV terminals 100*a* to 100*c*, the terminal 110, AV servers 120*a* to 120*c*, PLC bridges 131*a* to 131*c*, the Internet 140, the DNS server 150, the Web server 160, and a priority data information managing server 170.

The AV terminals 100*a* to 100*c* receive streams from the AV servers 120*a* to 120*c*, respectively, to reproduce video and audio. On the other hand, the terminal 110 receives from the Web server 160 data other than AV data, whereby, for example, Web pages can be browsed. The AV servers 120*a* to 120*c* transmit AV streams to the AV terminals 100*a* to 100*c*, respectively. The AV streams transmitted by the AV servers 120*a* to 120*c* are received by the AV terminals 100*a* to 100*c*, respectively, via the Internet 140 and the PLC bridges 131*a* to 131*c*. The DNS server 150 receives DNS packets from the AV terminals 100*a* to 100*c* and the terminal 110, and then performs name resolution by mapping the domain names to the IP addresses. The PLC bridges 131*a* to 131*c* perform communication assurance setting of AV flows, and based on the setting, performs relaying between: the AV terminals 100*a* to 100*c* and the terminal 110; and the AV servers 120*a* to 120*c* and the Web server 160. In addition, the PLC bridges 131*a* to 131*c* also relay DNS packets transmitted from the AV terminals 100*a* to 100*c* and the terminal 110 to the DNS server 150.

Figure 7:
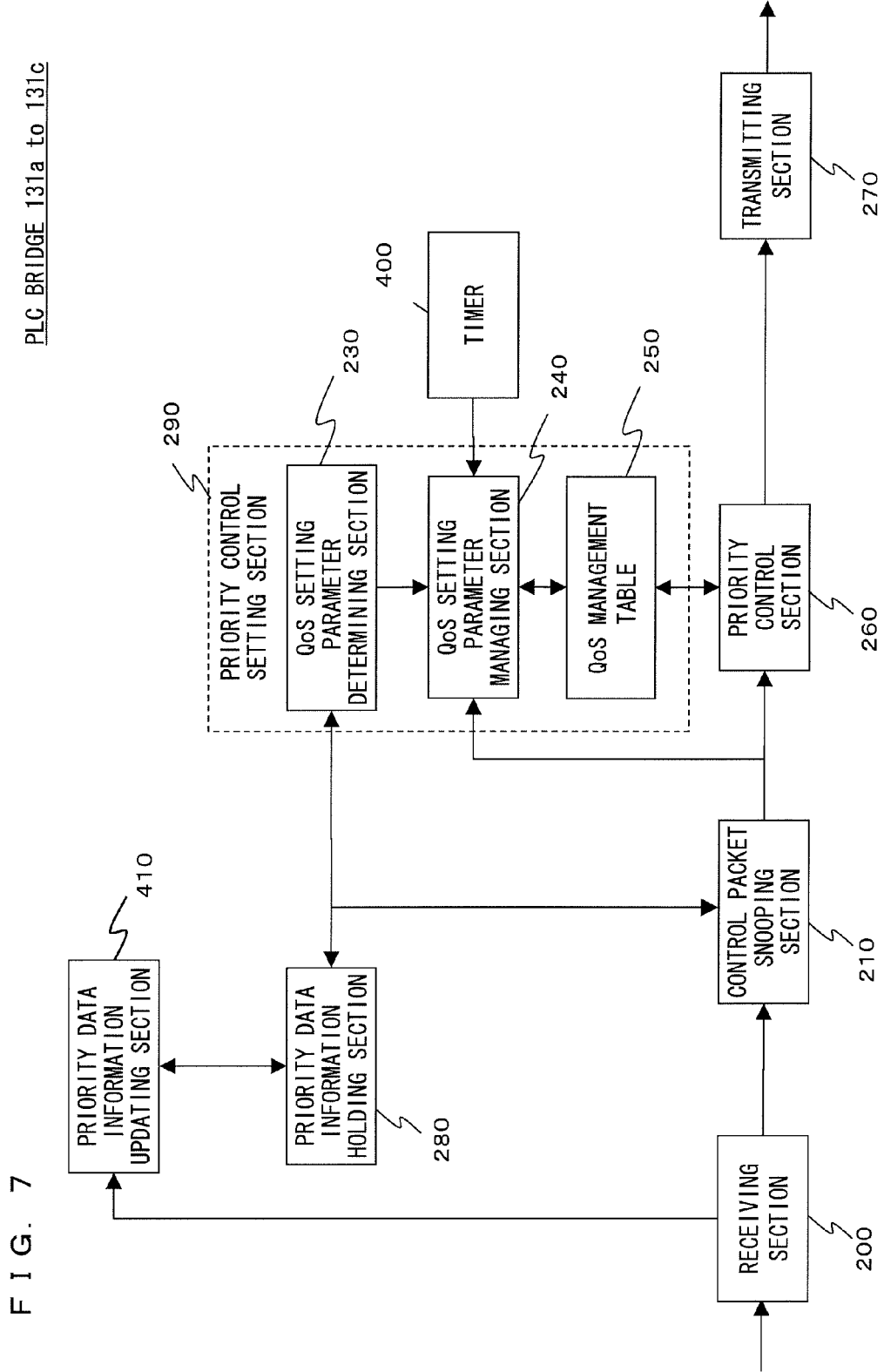
FIG. 7 shows a configuration of each of PLC bridges 131$a$ to 131$c$ according to the second embodiment of the present invention.

FIG. 7 shows a configuration of each of the PLC bridges 131*a* to 131*c* according to the second embodiment of the present invention. In FIG. 7, each of the PLC bridges 131*a* to 131*c* includes the receiving section 200, the control packet snooping section 210, the priority data information holding section 280, the priority control setting section 290, the priority control section 260, the transmitting section 270, a timer 400, and a priority data information updating section 410. The priority control setting section 290 includes the QoS setting parameter determining section 230, the QoS setting parameter managing section 240, and the QoS management table 250.

The receiving section 200 receives DNS packets from the AV terminals 100*a* to 100*c* existing in the network. The control packet snooping section 210 detects that a packet received by the receiving section 200 is a DNS packet, and specifies communication currently performed, based on a DNS query destination (domain name) of the DNS packet and QoS setting information held in the priority data information holding section 280. The priority control setting section 290 performs priority control setting for the specified communication, based on the QoS setting information held in the priority data information holding section 280. The priority data information holding section 280 holds, in advance, QoS setting information which is necessary to create a QoS management table. The QoS setting parameter determining section 230 of the priority control setting section 290 determines QoS setting parameters based on the QoS setting information held in the priority data information holding section 280. The QoS setting parameter managing section 240 registers in the QoS management table 250 the QoS setting parameters determined by the QoS setting parameter determining section 230. Further, the QoS setting parameter managing section 240 controls ON/OFF of a QoS function described below for QoS setting, and manages QoS settings, e.g., registers or deletes QoS settings. The timer 400 notifies, every time that a predetermined time period Ta elapses, the QoS setting parameter managing section 240 that the predetermined time has elapsed. In the present embodiment, the predetermined time period Ta is set to 1 second. In the QoS management table 250, elapsed time from when an AV flow matching managed QoS setting arrives is updated at the timing when the QoS setting parameter managing section 240 receives, from the timer 400, the notification that the predetermined time period Ta has elapsed. The QoS management table 250 manages QoS setting, elapsed time from when an AV flow matching managed QoS setting arrives, and information used for determining whether a QoS function based on a QoS setting is valid or invalid. Wherein, there is an upper limit to the number of QoS settings which the QoS management table 250 can manage. The priority control section 260 performs communication quality assurance such as priority control or bandwidth guarantee based on the QoS management table 250. The transmitting section 270 transmits a packet for which communication quality assurance has been performed by the priority control section 260.

Figure 8:
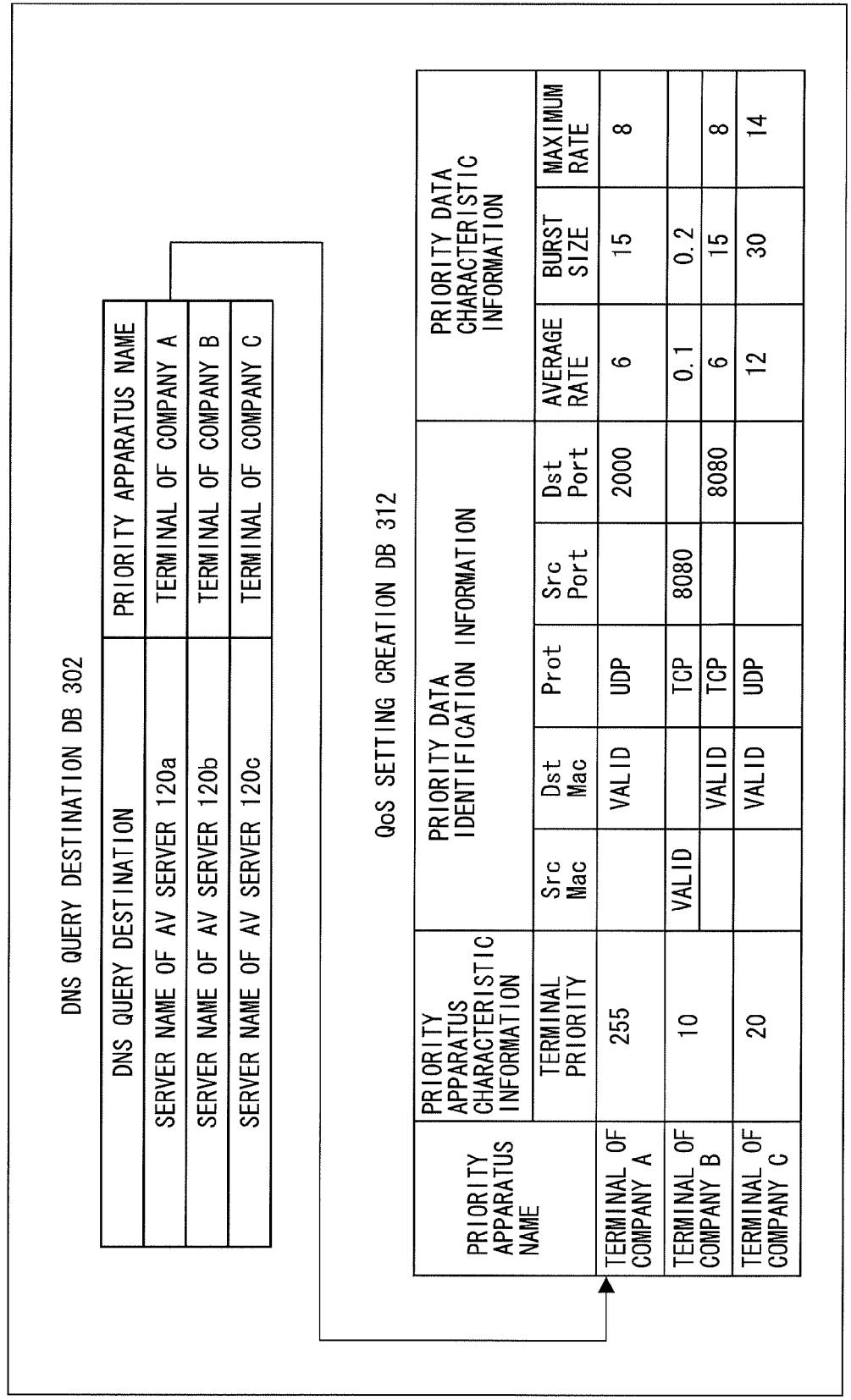
FIG. 8 shows a DNS query destination DB 302 and a QoS setting creation DB 312 held in the priority data information holding section 280.

Here, QoS setting information held by the priority data information holding section 280 will be described. FIG. 8 shows the DNS query destination DB 302 and the QoS setting creation DB 312 which are held in the priority data information holding section 280. In FIG. 8, the DNS query destination DB 302 is created based on the tendency that AV terminals provided by particular service companies access particular servers, respectively. For example, a terminal which accesses the AV server 120a of Company A is determined as a terminal, of Company A, which uses a service provided by Company A. The QoS setting creation DB 312 holds QoS setting parameters corresponding to each AV terminal. When the control packet snooping section 210 specifies, based on the DNS query destination DB 302 shown in FIG. 8, that a terminal which has transmitted the DNS packet is an AV terminal using a service provided by, for example, Company A, the QoS setting parameter determining section 230 of the priority control setting section 290 determines QoS setting parameters for the terminal of Company A based on the QoS setting creation DB 312.

The QoS setting creation DB 312 includes names of priority apparatuses, and includes priority apparatus characteristic information, priority data identification information, and priority data characteristic information, which correspond to each name of the priority apparatuses.

The priority apparatus characteristic information indicates a characteristic of each AV terminal. In the present embodiment, a terminal priority which indicates a priority set for each AV terminal is used as the priority apparatus characteristic information. However, the priority apparatus characteristic information is not limited thereto, and any parameters that indicate characteristics related to data communication performed by the AV terminals may be used as the priority apparatus characteristic information. For example, average rates or maximum rates of communication performed by the AV terminals, burst sizes each indicating how long transmission can be continuously performed at the maximum rate, maximum packet lengths, minimum packet lengths, delay tolerance values each indicating how long packets may delay, or the like may be used.

The priority data identification information is used for identifying, in data communication performed by the AV terminals, priority data on which priority control is to be performed. In the present embodiment, five parameters, i.e., SrcMac, DstMac, Prot, SrcPort, and DstPort, are used as the priority data identification information. SrcMac is set to "valid" in a case where priority control is to be performed on a packet whose source MAC address is a MAC address of an AV terminal. DstMac is set to "valid" in a case where priority control is to be performed on a packet whose destination MAC address is a MAC address of the AV terminal. Prot indicates a protocol, such as TCP or UDP, used for communication on which priority control is to be performed. SrcPort indicates source port numbers of TCP, UDP, etc., and DstPort indicates destination port numbers of TCP, UDP, etc. Note that the priority data identification information is not limited to these parameters, and any parameters that can be used for identifying priority data may be used as the priority data identification information. For example, source IP addresses, destination IP addresses, values of ToS (Type of Service), TC (Traffic Class), or VLAN in IP headers, or the like may be used.

The priority data characteristic information indicates characteristics of priority data, e.g., communication quality necessary for priority data used in communication performed by each AV terminal. In the present embodiment, average rates, burst sizes, and maximum rates of priority data communication are used as the priority data characteristic information. Note that the priority data characteristic information is not limited to the above-described information, and any information that indicates characteristics of priority data may be used as the priority data characteristic information. For example, maximum packet lengths, minimum packet lengths, delay tolerance values each indicating how long packets may delay, or the like may be used.

In the present embodiment, a data base that includes names of priority apparatuses and includes priority apparatus characteristic information, priority data identification information, and priority data characteristic information, which correspond to each name of the priority apparatuses, is described as an example of the QoS setting creation DB 312. However, the QoS setting creation DB 312 is not limited thereto. For example, information associated with names of priority apparatuses may include only priority apparatus characteristic information, or may include information necessary to perform other QoS setting.

The DNS query destination DB 302 and the QoS setting creation DB 312 held by the priority data information holding section 280 are required to be updated when a new AV terminal is developed or the specifications of the current AV terminal is changed. Each of the PLC bridges 131a to 131c may receive priority data update information from the priority data information managing server 170 and then the priority data information updating section 410 may update information held in the priority data information holding section 280 to the latest data.

Figure 9:
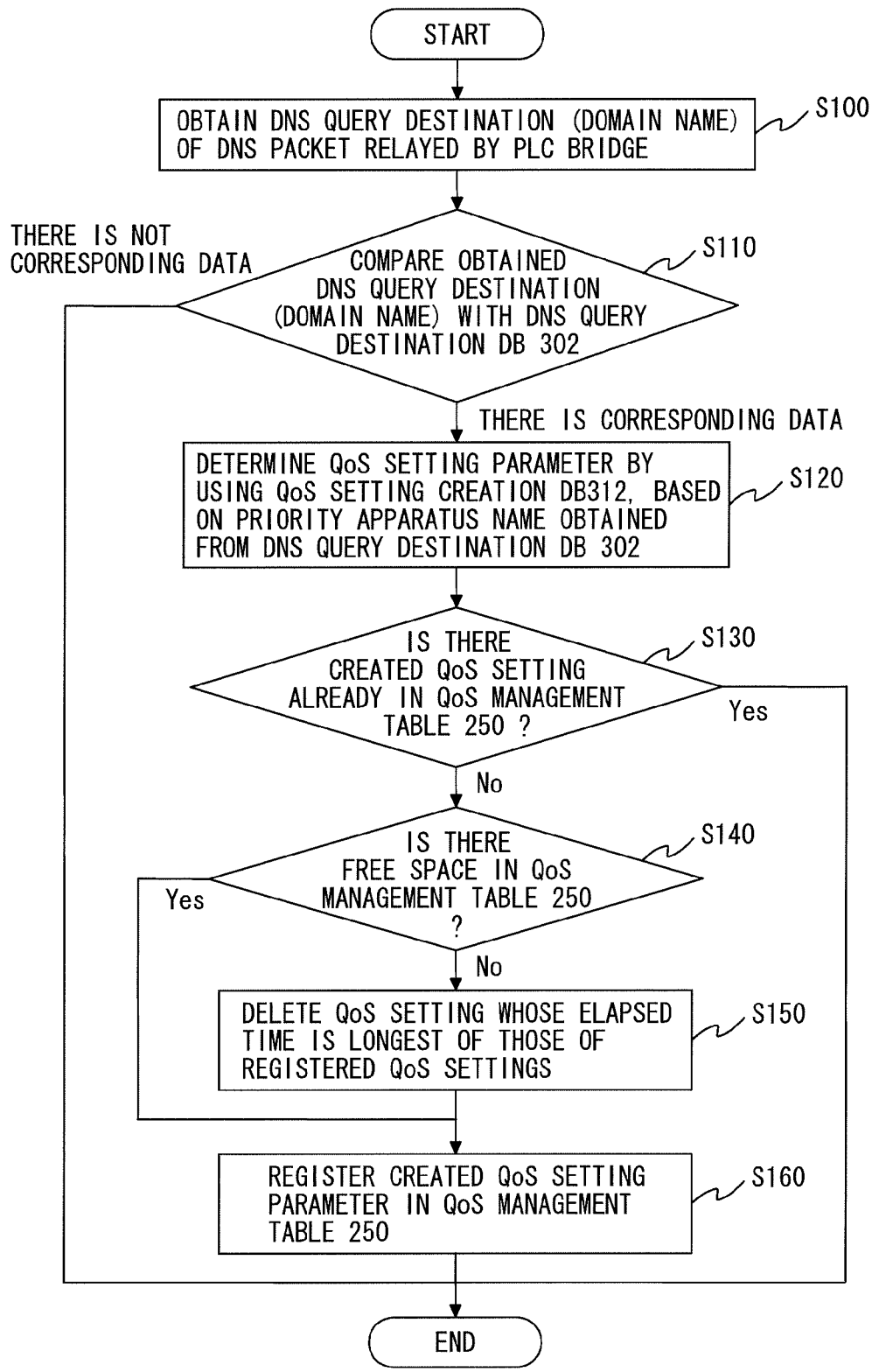
FIG. 9 is a flowchart showing QoS setting parameter registration processing which is performed from when each of the PLC bridges 131$a$ to 131$c$ receives a DNS packet to when QoS setting parameters are registered in a QoS management table 250.

Next, there will be described a flow of processing in which communication quality assurance is performed in the PLC bridges 131a to 131c. FIG. 9 shows QoS setting parameter registration processing which is performed from when each of the PLC bridges 131a to 131c receives a DNS packet to when each of the PLC bridges 131a to 131c registers QoS setting parameters in the QoS management table 250.

In step S100, the control packet snooping section 210 obtains a DNS query destination (domain name) of a DNS packet relayed by the PLC bridges 131a to 131c.

In step S110, the control packet snooping section 210 compares the DNS query destination (domain name) obtained in step S100 with DNS query destinations (domain names) contained in the DNS query destination DB 302 held in the priority data information holding section 280. In step S110, if there is not any corresponding data, the communication associated with the DNS query destination (domain name) of the DNS packet is not communication for which communication quality assurance is to be performed. Therefore QoS setting parameter registration processing is ended. In step S110, if there is corresponding data, processing of step S120 described below is performed.

In step S120, the priority control setting section 290 performs priority control setting for communication associated with the DNS query destination (domain name) of the DNS packet, based on the QoS setting information held in the priority data information holding section 280. Wherein, firstly, priority apparatus identification information for specifying as a priority apparatus the terminal which has transmitted the DNS packet, is created. FIG. 10 shows priority apparatus identification information 3121 for specifying an AV terminal on which priority control is to be performed. As shown in FIG. 10(a), a MAC address and a priority apparatus name of the AV terminal are held as priority apparatus identification information such that the MAC address and the priority apparatus name coincide with each other. In the present embodiment, a MAC address and a priority apparatus name of an AV terminal are used as priority apparatus identification information. However, an IP address may be further held, as shown in FIG. 10(b) as priority apparatus identification information. Alternatively, even in a case where only an IP address is held as shown in FIG. 10(c), it is possible to identify, based on only the IP address, an AV terminal on which priority control is to be performed. Thus, any information that can identify an AV terminal on which priority control is to be performed, may be held as priority apparatus identification information. However, if it is desired to further identify the type of an AV terminal, it is necessary to hold at least a priority apparatus name for specifying the type of an AV terminal.

Next, the QoS setting parameter determining section 230 determines QoS setting parameters based on the above-described priority apparatus identification information and the QoS setting creation DB 312 held in the priority data information holding section 280. FIG. 11 shows QoS setting parameters 3122 of the present embodiment. The QoS setting parameters 3122 of the present embodiment include SrcMac, DstMac, Prot, SrcPort, and DstPort that are set as data identification parameters, and include a service rate that is set as a data assurance parameter. Wherein values of the source MAC address and the destination MAC address of a packet to be identified are entered into SrcMac and DstMac, respectively; a protocol type such as TCP or UDP is entered into Prot; and the source port number and the destination port number of TCP, UDP, or the like are entered into SrcPort, and DstPort, respectively. A field into which a value for identification is not entered is not treated as a field where identification is performed. Note that data identification parameters are not limited to these parameters. Any parameters that can be used for identifying priority data may be used as data identification parameters. For example, a source IP address, a destination IP address, values of ToS, TC, or VLAN in an IP header, or the like may be used. For data assurance parameters, information which is required for quality assurance of data, e.g., delay tolerance values each indicating how long packets may delay, a buffer size necessary to prevent packet drop, or the like may be used.

In step S130, the QoS setting parameter managing section 240 confirms whether or not the QoS setting parameters determined by the QoS setting parameter determining section 230, and the terminal priority are already registered in the QoS management table 250. Then, if the QoS setting parameters and the terminal priority are registered in the QoS management table 250, the QoS setting parameter registration processing is ended. If the QoS setting parameters and the terminal priority are not registered in the QoS management table 250, processing of step S140 described below is performed.

In step S140, the QoS setting parameter managing section 240 confirms whether or not the QoS management table 250 has free space in which a new QoS setting can be registered. In step S140, if it is confirmed that the QoS management table 250 has free space, processing proceeds to step S160 to register, in the QoS management table 250, the QoS setting parameters determined by the QoS setting parameter determining section 230 and the terminal priority. In step S140, if it is confirmed that the QoS management table 250 does not have free space, processing of step S150 described below is performed.

In step S150, the QoS setting parameter managing section 240 deletes the QoS setting whose elapsed time is the longest of those of the QoS settings registered in the QoS management table 250, and then, in step S160, the QoS setting parameter managing section 240 registers in the QoS management table 250 the QoS setting parameters determined by the QoS setting parameter determining section 230 and the terminal priority.

Thus, each of the PLC bridges 130a to 130c can create and register the QoS setting parameters in the QoS management table 250 in a case where received DNS packets are packets transmitted from the AV terminals 100a to 100c.

Figure 12:
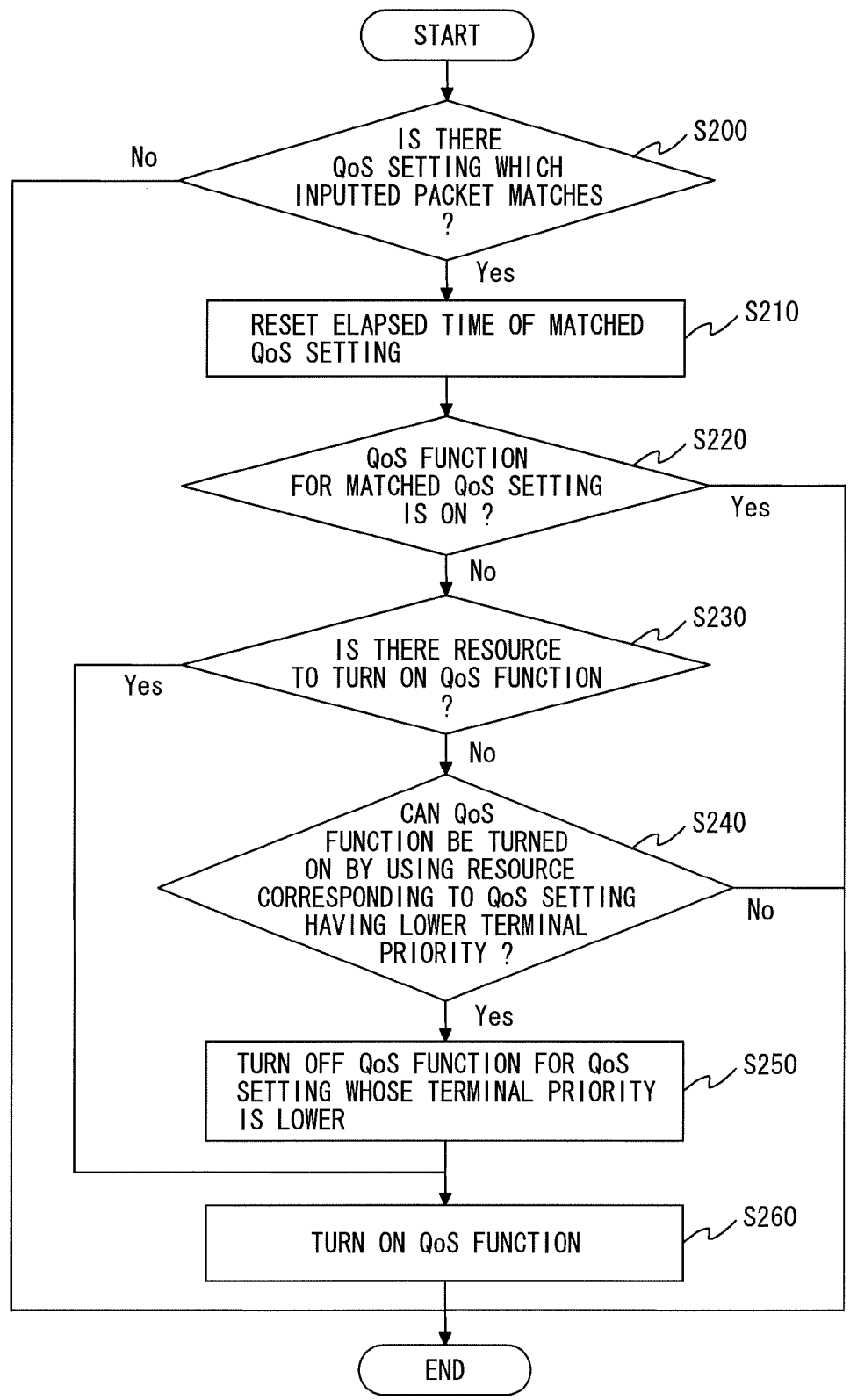
FIG. 12 is a flowchart showing processing performed when a QoS setting parameter managing section 240 turns on a QoS function.

Next, there will be described QoS function determination processing (ON case) in which a QoS function is turned on when a packet for which communication quality assurance is to be performed is inputted to each of the PLC bridges 130a to 130c. FIG. 12 is a flowchart showing processing performed when the QoS setting parameter managing section 240 turns on a QoS function.

In step S200, the QoS setting parameter managing section 240 determines whether or not the inputted packet matches a QoS setting registered in the QoS management table 250. Wherein, if the inputted packet does not match any QoS settings registered in the QoS management table 250, the QoS function is not turned on and the QoS function determination processing (ON case) is ended. If the inputted packet matches a QoS setting registered in the QoS management table 250, processing of step S210 described below is performed.

In step S210, the QoS setting parameter managing section 240 resets to 0 the elapsed time of the matched QoS setting in the QoS management table 250.

In step S220, the QoS setting parameter managing section 240 determines whether or not the QoS function for the matched QoS setting in the QoS management table 250 is ON. Wherein, if the QoS function is ON, the QoS function determination processing (ON case) is ended. If the QoS function is OFF, processing of step S230 described below is performed.

In step S230, the QoS setting parameter managing section 240 determines whether or not there is an available necessary network resource to turn on the QoS function of performing bandwidth guarantee and the like. If there is such a network resource, processing proceeds to step S260 to turn on the function for the matched QoS setting. If there is not such a network resource, processing of step S240 described below is performed.

In step S240, the QoS setting parameter managing section 240 determines whether or not there is, among QoS settings whose QoS functions are ON, a QoS setting whose terminal priority is lower than the terminal priority of the matched QoS setting and whether or not the QoS function for the matched QoS setting can be turned on by using a network resource corresponding to the QoS setting having the lower terminal priority. Wherein, if the QoS function for the matched QoS setting cannot be turned on, the QoS function determination processing (ON case) is ended. If the QoS function for the matched QoS setting can be turned on, processing of step S250 described below is performed.

In step S250, the QoS setting parameter managing section 240 turns off the QoS function for the QoS setting whose terminal priority is lower than the terminal priority of the matched QoS setting, among QoS settings whose QoS functions are ON. Thereafter, in step S260, QoS setting parameter managing section 240 turns on the QoS function for the matched QoS setting.

Figure 13:
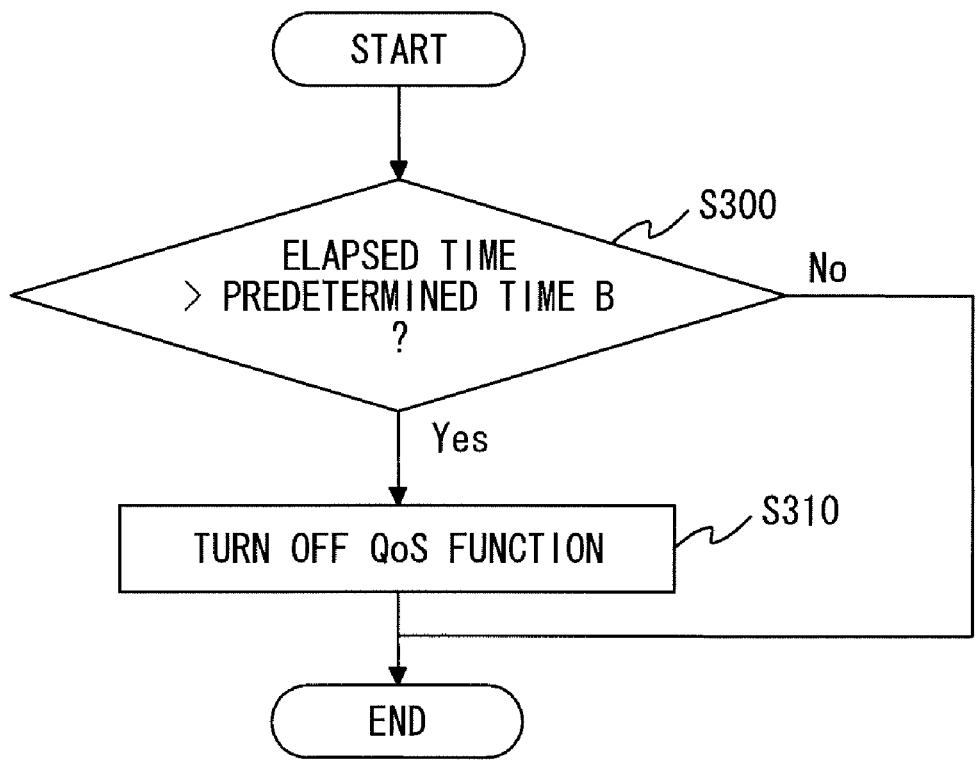
FIG. 13 is a flowchart showing processing performed when the QoS setting parameter managing section 240 turns off the QoS function.

Next, there will be described QoS function determination processing (OFF case) in which a QoS function is turned off if a packet for which communication quality assurance is to be performed is not inputted to each of the PLC bridges 130a to 130c for a predetermined time period. FIG. 13 is a flowchart showing processing performed when the QoS setting parameter managing section 240 turns off a QoS function.

In step S300, the QoS setting parameter managing section 240 determines, at the timing of updating elapsed time of each QoS setting in the QoS management table 250, whether or not the elapsed time of each QoS setting is equal to or greater than a predetermined time B. In the present embodiment, the timing of updating elapsed time of each QoS setting arrives every time that a predetermined time Ta (1 second), which is indicated by the timer 400, elapses. The predetermined time B is time from which it is determined that sufficient time has elapsed from when a packet for which communication quality assurance is to be performed has stopped flowing, and the predetermined time B is set to, for example, 3 minutes. If elapsed time of a QoS setting is less than the predetermined time B, the QoS function determination processing (OFF case) is ended. If elapsed time of a QoS setting is equal to or greater than the predetermined time B, processing proceeds to step S310 to turn off the QoS function for the QoS setting, and then the QoS function determination processing (OFF case) is ended.

The QoS management table 250, which is managed as described above, will be described in detail below. Firstly, the QoS management tables 250 of the PLC bridge 131a and the PLC bridge 131c will be described for a case where the AV terminal 100a and the AV terminal 100b transmit DNS packets to the DNS server 150 and that the AV terminal 100b performs AV flow communication.

FIGS. 14(a) and (b) show the QoS management tables 250 of the PLC bridge 131c and the PLC bridge 131a, respectively. In the PLC bridge 131c in FIG. 14(a), QoS setting NO. 01 is a QoS setting for the AV terminal 100a, and QoS setting NO. 02 is a QoS setting for the AV terminal 100b. In the PLC bridge 131a in FIG. 14(b), QoS setting NO. 11 is a QoS setting for the AV terminal 100b. It is noted that since the AV terminal 100b performs AV flow communication as described above, the QoS function for the QoS setting NO. 02 in the PLC bridge 131c of FIG. 14(a) is ON and the QoS function for the QoS setting NO. 11 in the PLC bridge 131a of FIG. 14(b) is ON.

The DNS packet of the AV terminal 100a which is the AV terminal of Company A is sent via the PLC bridge 131a and the PLC bridge 131c. At this time, since only DstMac is valid in the terminal of Company A as shown in the QoS setting creation DB 312 in FIG. 8, QoS setting is performed only in the PLC bridge 131c, which sets the AV terminal 100a as the destination MAC address and transmits a packet via a power line.

The DNS packet of the AV terminal 100b which is the AV terminal of Company B is sent via the PLC bridge 131a and the PLC bridge 131c. At this time, since both SrcMac and DstMac are valid in the terminal of Company B with reference to the QoS setting creation DB 312 in FIG. 8, QoS setting is performed in both of the PLC bridge 131a, which sets the AV terminal 100b as the source MAC address and transmits a packet via the power line, and the PLC bridge 131c, which sets the AV terminal 100b as the destination MAC address and transmits a packet via the power line.

Next, the QoS management table 250 of the PLC bridge 131c will be described for a case where the AV terminal 100a and the AV terminal 100c transmit DNS packets to the DNS server 150 and that the AV terminal 100a or the AV terminal 100c performs AV flow communication.

The DNS packet of the AV terminal 100a which is the AV terminal of Company A is sent via the PLC bridge 131a and the PLC bridge 131c. At this time, since only DstMac is valid in the terminal of Company A with reference to the QoS setting creation DB 312 in FIG. 8, QoS setting is performed only in the PLC bridge 131c, which sets the AV terminal 100a as the destination MAC address and transmits a packet via the power line. The DNS packet of the AV terminal 100c which is the AV terminal of Company C is sent via the PLC bridge 131b and the PLC bridge 131c. At this time, since only DstMac is valid in the terminal of Company C with reference to the QoS setting creation DB 312 in FIG. 8, QoS setting is performed only in the PLC bridge 131c, which sets the AV terminal 100c as the destination MAC address and transmits a packet via the power line.

FIG. 15(a) shows the QoS management table 250 of the PLC bridge 131c for a case where the AV terminal 100c performs AV flow communication. In the PLC bridge 131c in FIG. 15(a), QoS setting NO. 01 is a QoS setting for the AV terminal 100a, and QoS setting NO. 02 is a QoS setting for the AV terminal 100c. Here, the QoS function for the QoS setting NO. 02 is ON since the AV terminal 100c performs AV flow communication.

Next, there will be described a case where a band which can be used in PLC is 15 Mbps and the AV terminal 100a starts AV flow communication. FIG. 15(b) shows the QoS management table 250 of the PLC bridge 131c in a case where the AV terminal 100a starts AV flow communication when the PLC bridge 131c is in the above-described state shown in FIG. 15(a). When the AV terminal 100a starts AV flow communication, it is determined as shown in FIG. 12 whether or not the QoS function for the QoS setting No. 01 in the QoS management table 250 of the PLC bridge 131c can be turned on. In step S230 of FIG. 12 showing QoS function determination processing (ON case), the QoS setting parameter managing section 240 determines that it is impossible to turn on the QoS functions for both the QoS settings NO. 01 and NO. 02 at the same time under the condition that the band which can be used in PLC is no more than 15 Mbps. In steps S240 and S250, based on terminal priorities as criteria, the QoS setting parameter managing section 240 turns off the QoS function for the QoS setting NO. 02 which has a lower terminal priority than that of the QoS setting NO. 01. Thereafter, in step S260, the QoS setting parameter managing section 240 turns on the QoS function for the QoS setting NO. 01 which has a higher terminal priority than that of the QoS setting NO. 02.

As described above, in the relay apparatus according to the second embodiment of the present invention, the relay apparatus according to the first embodiment of the present invention is applied to PLC bridges and further, priority control setting of priority data is performed for each AV terminal, thereby reducing processing load for QoS setting for an AV flow which is used in real time communication, and further enabling detection of not only an AV flow for which a published protocol is used, but also an AV flow for which an unpublished protocol or a unique protocol is used.

In the present embodiment, an AV terminal transmitting a DNS packet is specified and priority control setting of priority data is performed for each AV terminal. However, considering the network at home using PLC, priority control setting of priority data may be performed for each set-top box, for example. When a set-top box is started, a DNS packet is transmitted from the set-top box, and then the provided service or the set-top box is specified based on the DNS packet. In this case, if the relay apparatus further includes priority communication apparatus information storing section for storing information regarding set-top boxes, QoS setting can be performed for each set-top box based on QoS setting information held in the priority data information holding section. Even in a case where priority control setting of priority data is performed for each set-top box as described above, it should be understood that the same effect can be obtained.

In the present embodiment, QoS settings are managed separately by the PLC bridges 131a to 131c, respectively. However, one of the PLC bridges may manage QoS settings in a centralized manner. In this case, a PLC bridge which creates QoS setting parameters notifies a PLC bridge which manages QoS settings, of the QoS setting parameters.

In the present embodiment, only an AV flow is used as priority data. However, priority control may also be performed for data regarding a protocol for controlling an AV flow and/or a condition notification packet for notifying a communication condition of an AV flow.

In the present embodiment, a priority apparatus for which communication assurance is performed is specified based on the DNS query destination (domain name) of a DNS packet. However, an IP address of a particular server can also be used. In this case, a terminal performing communication directed to an IP address of a particular server is specified as an AV terminal. Moreover, by using a domain name, of a location service, registered in a REGISTER message from a SIP terminal, a priority apparatus for which communication assurance is to be performed can also be specified based on the domain name. Thus, any information that can specify an AV terminal as a priority apparatus may be used.

Moreover, in the present embodiment, a priority apparatus for which communication assurance is to be performed is specified. However, a terminal which is desired to be a non-priority terminal may be specified. Although values of data assurance parameters used in a case where a non-priority terminal is specified are different from those used in a case where a priority terminal is specified, these two cases are the same in that a terminal whose priority is desired to be changed is specified. In a case where a non-priority terminal is specified, by setting a priority of communication performed by the specified non-priority terminal to be lower than a priority of communication performed by other terminals, communication quality assurance can be performed for a terminal which is desired to be prioritized.

Even in a case where an AV terminal is specified in either method described above, control is performed in accordance with characteristic information of the specified AV terminal, thereby enabling communication quality assurance to be realized in which appropriate priority setting is performed for each AV terminal.

In the present embodiment, an AV terminal using a service is specified based on a DNS packet, and QoS setting parameters are set for each AV terminal. However, the present invention is not limited thereto. Even in a case where QoS setting parameters are set for each service providing carrier or for each provided service as described in the first embodiment of the present invention, it should be understood that the same effect can be obtained.

Third Embodiment

Figure 16:
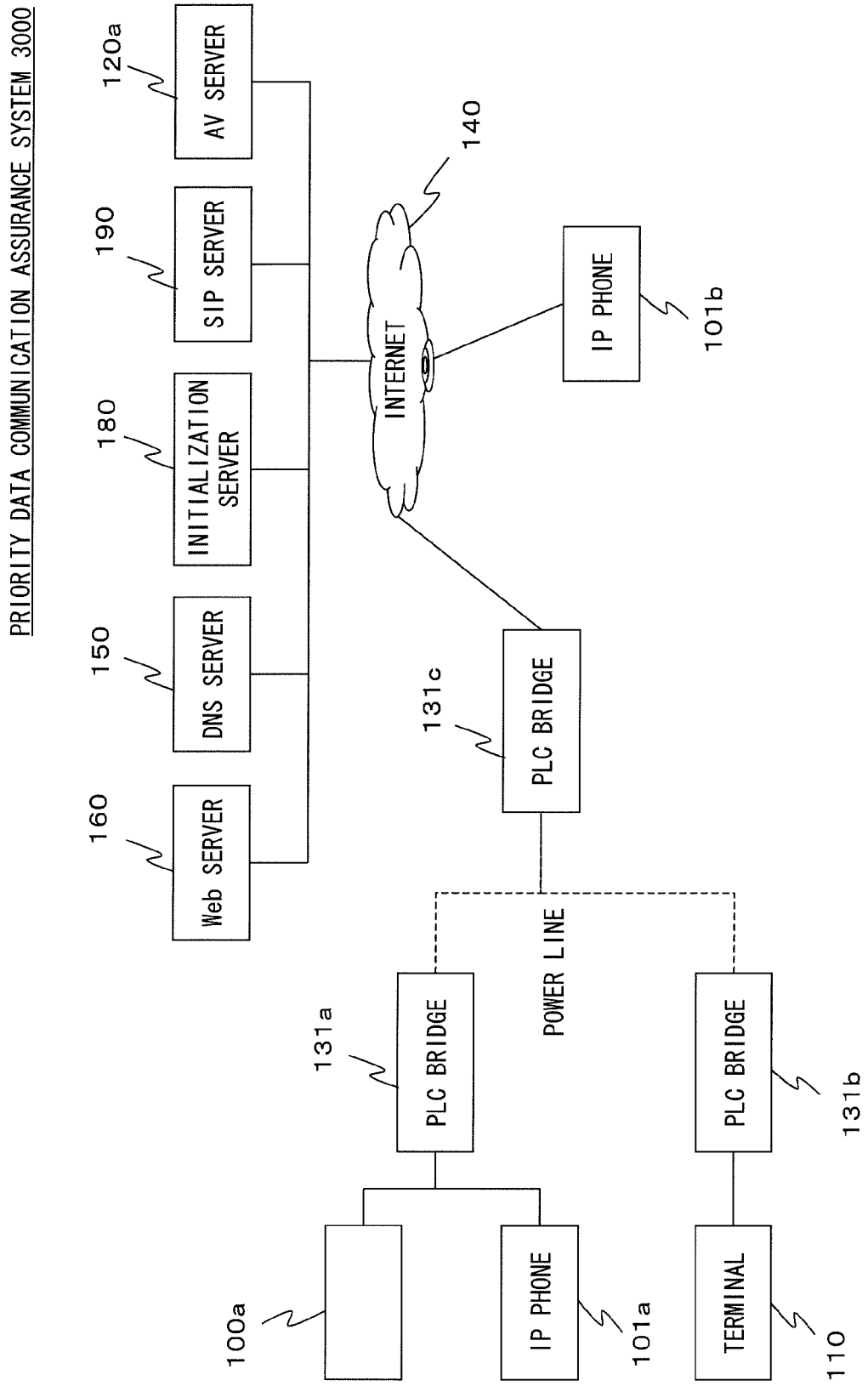
FIG. 16 shows a configuration of a priority data communication assurance system 3000 according to the third embodiment of the present invention.
Figure 20:
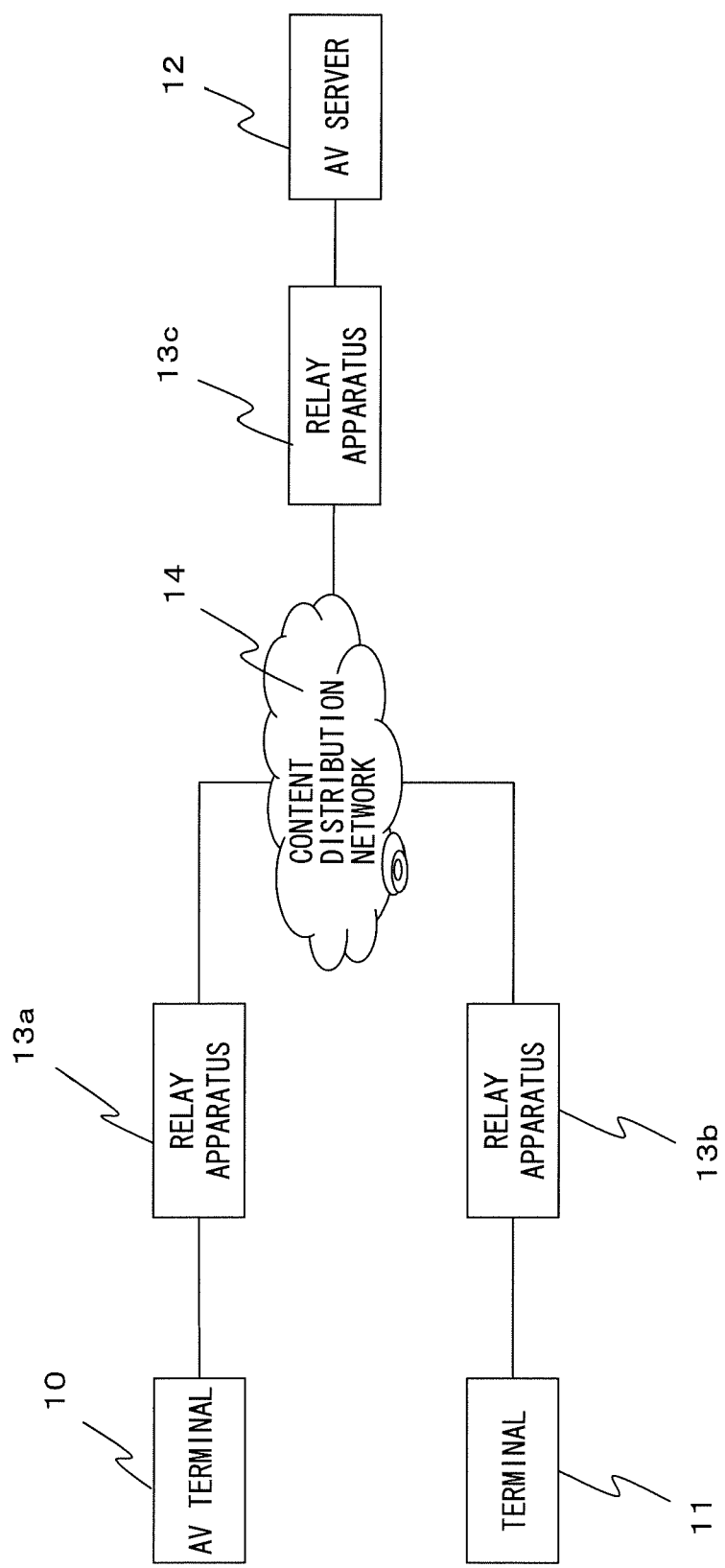
FIG. 20 shows a configuration of a content distribution quality control system 9000 of conventional art.
Figure 21:
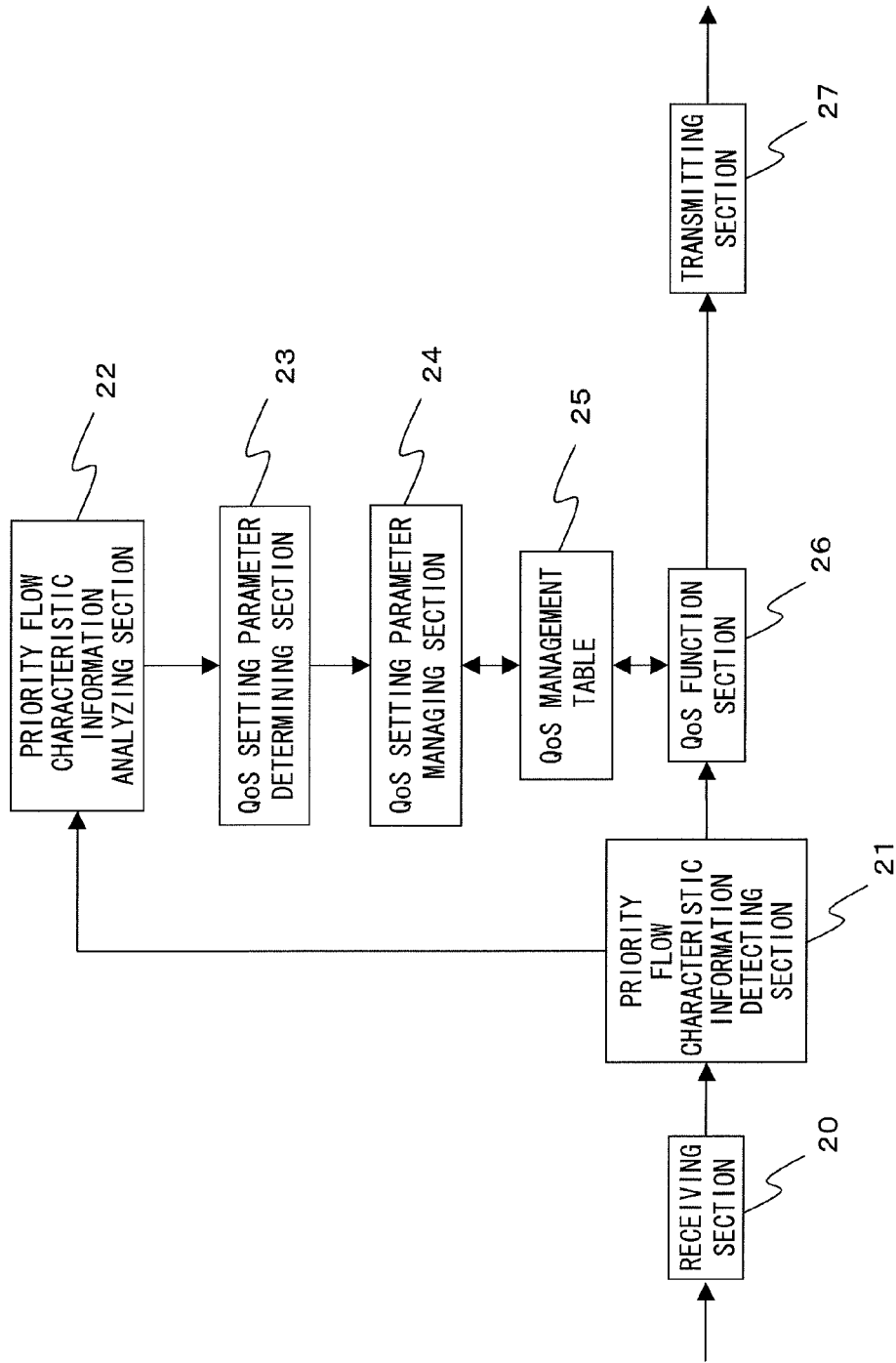
FIG. 21 shows a configuration of each of relay apparatuses 13$a$ to 13$c$ of conventional art.
Figure 22:
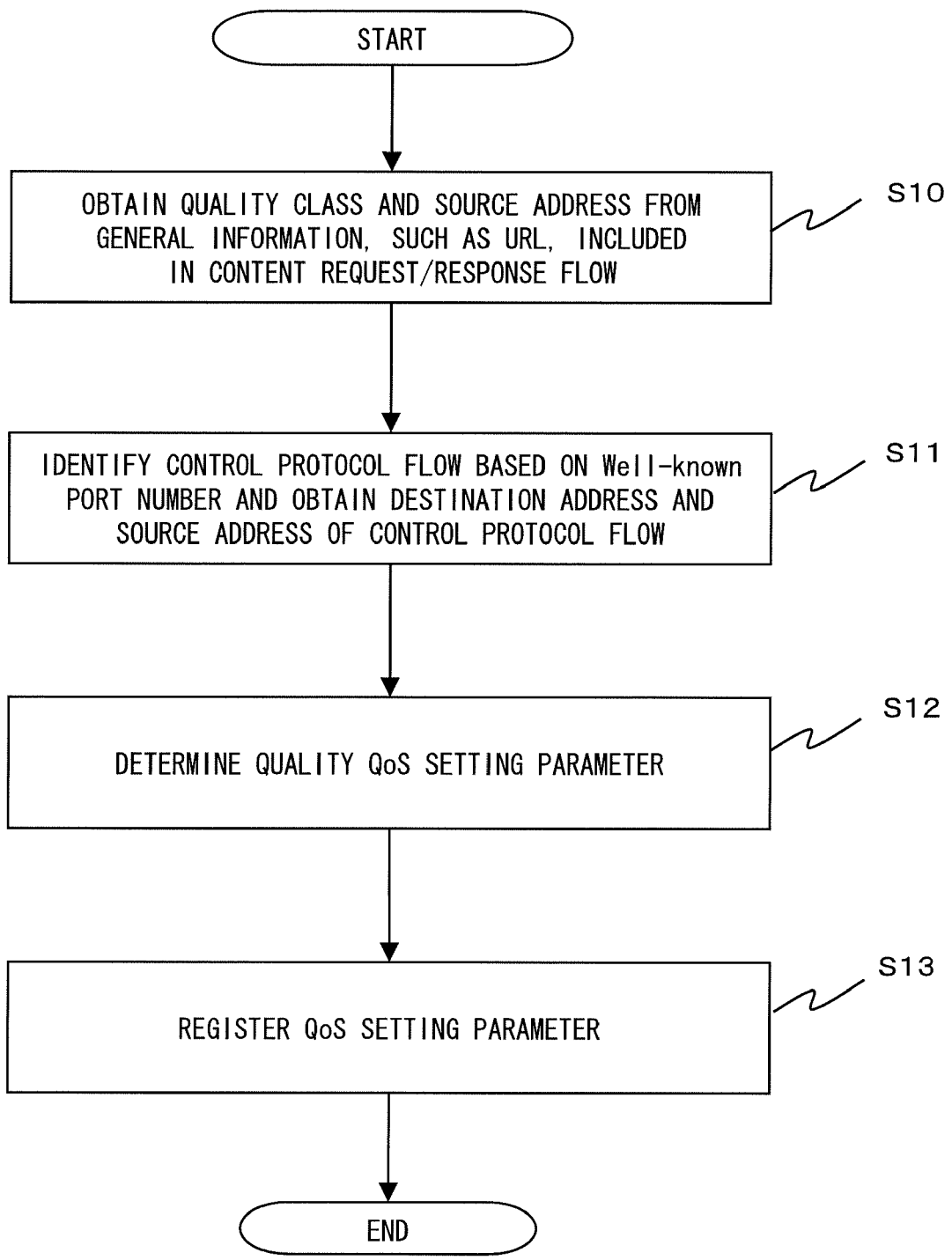
FIG. 22 is a flowchart showing steps of communication quality assurance of an AV flow of conventional art.
Figure 23:
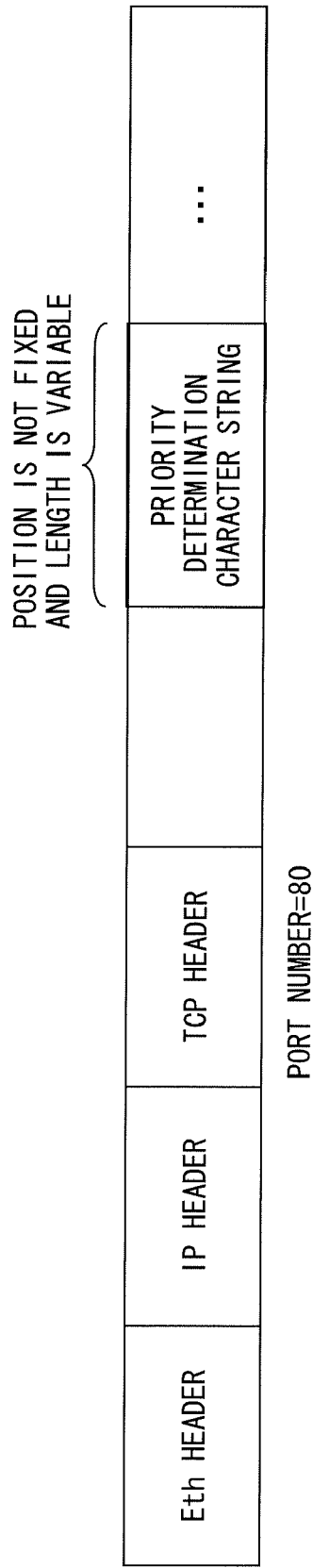
FIG. 23 shows an HTTP packet format.

In the present embodiment, there will be specifically described a case where: the PLC bridges described in the second embodiment of the present invention are used as relay apparatuses; and an AV terminal which receives a AV stream to reproduce video and audio, and an IP phone which performs audio communication on the IP (Internet Protocol) network are further used. Wherein, priority data communication is performed by using an AV flow sent by an AV terminal and a VoIP (Voice over IP) flow sent by an IP phone. FIG. 16 shows a configuration of a priority data communication assurance system 3000 according to the third embodiment of the present invention. In FIG. 16, the priority data communication assurance system 3000 includes the AV terminal 100a, IP phones 101a to 101b, the terminal 110, the AV server 120a, the PLC bridges 131a and 131c, the Internet 140, the DNS server 150, the Web server 160, an initialization server 180, and a SIP server 190. In FIG. 16, the same components as those shown in FIG. 6 will be denoted by the same reference numerals as those used in FIG. 6, and description thereof is omitted.

The IP phones 101a to 101b are IP phones which perform audio communication on the IP network. The initialization server 180 is accessed to obtain information which is necessary to initialize the IP phones 101a and 101b when they are started. The SIP server 190 is a server which is necessary for the IP phones 101a and 101b to perform audio communication.

The PLC bridges 131a to 131c, which are relay apparatuses according to the present embodiment, are the same as those in FIG. 7 described in the second embodiment of the present invention. Therefore, detailed description thereof is omitted. FIG. 17 shows a DNS query destination DB 303 and a QoS setting creation DB 313 held in the priority data information holding section 280 of each of the PLC bridges 131a to 131c according to the present embodiment. In FIG. 17, priority apparatus names, priority data identification information, and priority data characteristic information, which are specific to particular service companies, are not used in the DNS query destination DB 303 and the QoS setting creation DB 313, unlike the DNS query destination DB 302 and the QoS setting creation DB 312 in FIG. 8 described in the second embodiment of the present invention. In FIG. 17, the DNS query destination DB 303 is created based on the tendency that AV terminals using particular services access particular servers, respectively, and that IP phones using particular services access particular servers, respectively. Here, a terminal which accesses the AV server 120a is determined as an AV terminal, and a terminal which accesses the initialization server 180 or the SIP server 190 is determined as an IP phone. The QoS setting creation DB 313 holds QoS setting parameters for each type of terminal apparatuses. The QoS setting creation DB 313 includes priority apparatus types, priority apparatus characteristic information corresponding to each priority apparatus type, and data assurance parameters corresponding to each priority apparatus type. If, based on the DNS query destination DB 303 shown in FIG. 17, the control packet snooping section 210 specifies a terminal having transmitted a DNS packet as, for example, an IP phone, the QoS setting parameter determining section 230 of the priority control setting section 290 determines QoS setting parameters for the IP phone based on the QoS setting creation DB 313.

Each of the PLC bridges 131a to 131c according to the present embodiment performs QoS setting parameter registration processing based on the above-described QoS setting information held in the priority data information holding section 280, and then controls ON/OFF of QoS functions in the QoS management table 250 in which the registration has been performed. A flow of this processing is the same as the processing that is described in the second embodiment of the present invention with reference to FIG. 9, FIG. 12, and FIG. 13. Therefore, detailed description thereof is omitted. The QoS management table 250 of the present embodiment will be described in detail below.

Firstly, in the IP phone 101a and the AV terminal 100a, DNS packets transmitted by the IP phone 101a and the AV terminal 100a are sent via the PLC bridge 131a and the PLC bridge 131c. In order to assure flows sent by the IP phone 101a and the AV terminal 100a, QoS setting is performed in the PLC bridge 131c such that the IP phone 101a and the AV terminal 100a are set as destination MAC addresses and QoS setting is performed in the PLC bridge 131a such that the IP phone 101a and the AV terminal 100a are set as source MAC addresses.

FIGS. 18(a) and (b) show the QoS management tables 250 of the PLC bridge 131c and the PLC bridge 131a, respectively. FIG. 18(a) shows the QoS management table 250 of the PLC bridge 131c in a case where the IP phone 101a performs VoIP flow communication. In the PLC bridge 131c in FIG. 18(a), QoS setting NO. 01 is a QoS setting for the IP phone 101a, and QoS setting NO. 02 is a QoS setting for the AV terminal 100a. FIG. 18(b) shows the QoS management table 250 of the PLC bridge 131a in a case where the IP phone 101a performs VoIP flow communication. In the PLC bridge 131a in FIG. 18(b), QoS setting NO. 11 is a QoS setting for the IP phone 101a, and QoS setting NO. 12 is a QoS setting for the AV terminal 100a. Here, since the IP phone 101a performs VoIP flow communication, the QoS function for the QoS setting NO. 01 in the PLC bridge 131c of FIG. 18(a) and the QoS function for the QoS setting NO. 11 in the PLC bridge 131a of FIG. 18(b) are ON.

In the present embodiment, the QoS management table 250 includes priority apparatus characteristic information, data identification parameters, data assurance parameters, elapsed time, and operating states of QoS functions, and is the same as in FIG. 14 and FIG. 15 in the second embodiment. However, parameters used as data identification parameters and data assurance parameters are different from those of the second embodiment.

In the present embodiment, SrcMac and DstMac are used as data identification parameters. However, data identification parameters are not limited thereto. Any parameters that can be used for identifying priority data may be used as data identification parameters. For example, a source IP address, a destination IP address, values of ToS, TC, or VLAN in an IP header, or the like may be used.

In the present embodiment, priority of communication and a delay tolerance value which are held in the QoS setting creation DB 313, are used for data assurance parameters. However, data assurance parameters are not limited thereto. Any information that is necessary to perform quality assurance of data may be used for data assurance parameters. For example, a service rate, a buffer size, or the like may be used.

As described above, in the relay apparatus according to the third embodiment of the present invention, QoS setting is performed for each type of terminal apparatus also in the network in which an AV terminal and IP phone are used, thereby, similarly to the first and the second embodiments of the present invention, reducing processing load for QoS setting for an AV flow which is used in real time communication, and further enabling detection of not only an AV flow for which a published protocol is used, but also an AV flow for which an unpublished protocol or a unique protocol is used.

In the DNS query destination DB 303 of the present embodiment, information corresponding to types of priority apparatuses, such as an IP phone and an AV terminal, is used as priority apparatus names, and in the QoS setting creation DB 313, priority data identification information and priority data characteristic information are not used and communication quality assurance is performed by using only data assurance parameters. QoS setting in which communication quality assurance is performed only by using these data assurance parameters is effective in a case where, for example, a protocol or a port number used for priority data is not fixed and a characteristic of an AV flow cannot be specified.

In the present invention, even if a transmitting terminal and a receiving terminal for an AV flow and the like cannot perform automatic QoS setting, detection of an AV terminal, an AV flow, and the like can be performed at low load by using a relay apparatus whose resources are limited. Therefore, communication quality assurance and the like can be performed for an AV flow in various situations. Moreover, this method for detecting an AV terminal, an AV flow, and the like is applicable to various types of AV flows and the like and has broad utility, and since the type of an AV terminal can be specified in this method, this method can be effectively used also for, e.g., automatically distinguishing between a commercial service and a non-commercial service.

The invention claimed is:

1. A communication apparatus used in a network where data communication is performed, the communication apparatus comprising:

a priority data information holding section configured to hold, in advance, QoS (Quality of Service) setting information corresponding to domain names, the QoS setting information being necessary to perform a QoS setting for data communicated in the network;

a control packet snooping section configured to detect a DNS (Domain Name System) packet transmitted to a DNS server in the network for determining a QoS setting for data communication by the communication apparatus and prior to data communication that is subjected to QoS processing, or detect a DNS response packet, which is a response to the DNS and received from the DNS server, for determining the QoS setting for data communication by the communication apparatus and prior to data communication that is subjected to QoS processing, and configured to obtain a domain name contained in the DNS packet or in the DNS response packet; and a priority control setting section configured to, when QoS setting information corresponding to the obtained domain name exists in the QoS setting information held in the priority data information holding section, perform, based on the QoS setting information, a QoS setting for actual data communication performed by a communication apparatus which is the transmission source of the DNS packet, wherein the control packet snooping section specifies a provided service based on the domain name contained in the DNS packet or in the DNS response packet, and based on the provided service and the QoS setting information, the priority control setting section performs, for the provided service, a QoS setting for data communication performed by the communication apparatus which is the transmission source of the DNS packet, and wherein the QoS setting information includes priority data identification information used for identifying priority data which is communicated in the provided service and whose communication quality is to be assured, and the priority control setting section further performs a QoS setting for the priority data, based on the priority data identification information.

2. The communication apparatus according to claim 1, wherein the control packet snooping section specifies a service providing carrier based on the domain name contained in the DNS packet or in the DNS response packet, and based on the service providing carrier and the QoS setting information, the priority control setting section performs, for the service providing carrier, a QoS setting for data communication performed by the communication apparatus which is the transmission source of the DNS packet.

3. The communication apparatus according to claim 1, wherein the priority data identification information includes at least one of a protocol type and a port number.

4. The communication apparatus according to claim 1, wherein the QoS setting information held, in advance, in the priority data information holding section is updated by using information held in an external apparatus connected to the communication apparatus according to claim 1.

5. The communication apparatus according to claim 1, wherein based on an IP address contained in a DNS response packet, the control packet snooping section specifies a provided service, the IP address corresponding to the domain name contained in the DNS packet or in the DNS response packet, and based on the provided service and the QoS setting information, the priority control setting section performs, for the provided service, a QoS setting for data communication performed by the communication apparatus which is the transmission source of the DNS packet.

6. The communication apparatus according to claim 1, wherein the control packet snooping section analyzes, when the domain name contained in the DNS packet or in the DNS response packet is that of a SIP (Session Initiation Protocol) server, a SIP packet received from the SIP server and thereby specifies the corresponding communication apparatus performing communication with the communication apparatus which is the transmission source of the DNS packet, and the priority control setting section performs, based on the QoS setting information, a QoS setting for data communication performed between the corresponding communication apparatus and the communication apparatus which is the transmission source of the DNS packet.

7. The communication apparatus according to claim 1, further comprising a priority control section for relaying data communicated in the network, based on the QoS setting.

8. The communication apparatus according to claim 1, wherein the QoS setting is performed for priority data whose communication quality is to be assured, the priority data being among the data communicated in the network.

9. The communication apparatus according to claim 1, wherein the QoS setting is performed for data other than priority data whose communication quality is to be assured, the priority data being among the data communicated in the network.

10. A communication apparatus used in a network where data communication is performed, the communication apparatus comprising:

a priority data information holding section configured to hold, in advance, QoS (Quality of Service) setting information corresponding to domain names, the QoS setting information being necessary to perform a QoS setting for data communicated in the network;

a control packet snooping section configured to detect a DNS (Domain Name System) packet transmitted to a DNS server in the network for determining a QoS setting for data communication by the communication apparatus and prior to data communication that is subjected to QoS processing, or detect a DNS response packet, which is a response to the DNS and received from the DNS server, for determining the QoS setting for data communication by the communication apparatus and prior to data communication that is subjected to QoS processing, and configured to obtain a domain name contained in the DNS packet or in the DNS response packet;

a priority control setting section configured to, when QoS setting information corresponding to the obtained domain name exists in the QoS setting information held in the priority data information holding section, perform, based on the QoS setting information, a QoS setting for actual data communication performed by a communication apparatus which is the transmission source of the DNS packet; and a priority communication apparatus information storing section configured to store priority communication apparatus information which indicates information about a communication apparatus which is the transmission source of the DNS packet and which communicates priority data whose communication quality is to be assured, the priority data being among the data communicated in the network, wherein the priority control setting section further performs, based on the priority communication apparatus information, a QoS setting for data communication performed by the communication apparatus which is the transmission source of the DNS packet, and wherein the control packet snooping section specifies a provided service based on the domain name contained in the DNS packet or in the DNS response packet, and based on the provided service and the QoS setting information, the priority control setting section performs, for the provided service, a QoS setting for data communication performed by the communication apparatus which is the transmission source of the DNS packet.

11. A communication apparatus used in a network where data communication is performed, the communication a apparatus comprising:

a priority data information holding section configured to hold, in advance, QoS (Quality of Service) setting information corresponding to domain names, the QoS setting information being necessary to perform a QoS setting for data communicated in the network;

a control packet snooping section configured to detect a DNS (Domain Name System) packet transmitted to a DNS server in the network for determining a QoS setting for data communication by the communication apparatus and prior to data communication that is subjected to QoS processing, or detect a DNS response packet, which is a response to the DNS and received from the DNS server, for determining the QoS setting for data communication by the communication apparatus and prior to data communication that is subjected to QoS processing, and configured to obtain a domain name contained in the DNS packet or in the DNS response packet;

a priority control setting section configured to, when QoS setting information corresponding to the obtained domain name exists in the QoS setting information held in the priority data information holding section, perform, based on the QoS setting information, a QoS setting for actual data communication performed by a communication apparatus which is the transmission source of the DNS packet; and a priority communication apparatus information storing section configured to store priority communication apparatus information which indicates information about a communication apparatus which is the transmission source of the DNS packet and which communicates priority data whose communication quality is to be assured, the priority data being among the data communicated in the network, wherein the QoS setting information includes priority data identification information used for identifying priority data which is communicated in the provided service and whose communication quality is to be assured, and the priority control setting section further performs a QoS setting for the priority data, based on the priority communication apparatus information and the priority data identification information, and wherein the control packet snooping section specifies a provided service based on the domain name contained in the DNS packet or in the DNS response packet, and based on the provided service and the QoS setting information, the priority control setting section performs, for the provided service, a QoS setting for data communication performed by the communication apparatus which is the transmission source of the packet.

12. The communication apparatus according to claim 11, wherein the priority data identification information includes at least one of a protocol type and a port number.

13. A communication apparatus used in a network where data communication is performed, the communication apparatus comprising:

a priority data information holding section configured to hold, in advance, QoS (Quality of Service) setting information corresponding to domain names, the QoS setting information being necessary to perform a QoS setting for data communicated in the network;

a control packet snooping section configured to detect a DNS (Domain Name System) packet transmitted to a DNS server in the network for determining a QoS setting for data communication by the communication apparatus and prior to data communication that is subjected to QoS processing, or detect a DNS response packet, which is a response to the DNS and received from the DNS server, for determining the QoS setting for data communication by the communication apparatus and prior to data communication that is subjected to QoS processing, and configured to obtain a domain name contained in the DNS packet or in the DNS response packet; and a priority control setting section configured to, when QoS setting information corresponding to the obtained domain name exists in the QoS setting information held in the priority data information holding section, perform, based on the QoS setting information, a QoS setting for actual data communication performed by a communication apparatus which is the transmission source of the DNS packet, wherein the QoS setting information includes priority data characteristic information which indicates a transmission characteristic with respect to priority data which is communicated in the provided service and whose communication quality is to be assured, and the priority control setting section further performs a QoS setting for the priority data, based on the priority data characteristic information, and wherein the control packet snooping section specifies a provided service based on the domain name contained in the DNS packet or in the DNS response packet, and based on the provided service and the QoS setting information, the priority control setting section performs, for the provided service, a QoS setting for data communication performed by the communication apparatus which is the transmission source of the DNS packet.

14. The communication apparatus according to claim 13, wherein the priority data characteristic information includes at least one of an average rate, a burst size, and a maximum rate.

15. A QoS (Quality of Service) setting method performed by a communication apparatus used in a network where data communication is performed, the QoS setting method comprising:

a priority data information holding step of holding, in advance, QoS setting information corresponding to domain names, which QoS setting information is necessary to perform a QoS setting for data communicated in the network;

a control packet snooping step of detecting a DNS packet received from a DNS (Domain Name System) server in the network for determining a QoS setting for data communication by the communication apparatus and prior to data communication that is subjected to QoS processing, or detecting a DNS response packet, which is a response to the DNS packet and received from the DNS server, for determining the QoS setting for data communication by the communication apparatus and prior to data communication that is subjected to QoS processing, and of obtaining a domain name contained in the DNS packet or in the DNS response packet; and a priority control setting step of, when QoS setting information corresponding to the domain name obtained in the control packet snooping step exists in the QoS setting information held in the priority data information holding step, performing, based on the QoS setting information, a QoS setting for actual data communication performed by a communication apparatus which is the transmission source of the DNS packet, wherein the control packet snooping step specifies a provided service based on the domain name contained in the DNS packet or in the DNS response packet, and based on the provided service and the QoS setting information, the priority control setting step performs, for the provided service, a QoS setting data communication performed by the communication apparatus which is the transmission source of the DNS packet, and wherein the QoS setting information includes priority data identification information used for identifying priority data which is communicated in the provided service and whose communication quality is to be assured, and the priority control setting step further performs a QoS setting for the priority data, based on the priority data identification information.

* * * * *